(12) United States Patent
Kikitsu et al.

(10) Patent No.: US 6,881,495 B2
(45) Date of Patent: Apr. 19, 2005

(54) MAGNETIC RECORDING MEDIUM INCLUDING FUNCTIONAL AND RECORDING LAYERS ORTHOGONALLY EXCHANGE COUPLED

(75) Inventors: Akira Kikitsu, Kanagawa-ken (JP); Tadashi Kai, Kanagawa-ken (JP); Junichi Akiyama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/183,603

(22) Filed: Jun. 28, 2002

(65) Prior Publication Data

US 2003/0017364 A1 Jan. 23, 2003

(30) Foreign Application Priority Data

Jun. 29, 2001 (JP) ........................................ 2001-197771

(51) Int. Cl.[7] .................................................. G11B 5/73
(52) U.S. Cl. ...................... 428/611; 428/212; 428/409; 428/694 TS; 428/694 TM
(58) Field of Search ........................ 360/59; 369/13.05, 369/13.06, 13.41, 13.42, 13.43, 13.44, 13.56; 428/611, 65.3, 212, 409, 694 TS, 694 TM

(56) References Cited

U.S. PATENT DOCUMENTS

| | | | | |
|---|---|---|---|---|
| 5,321,570 A | * | 6/1994 | Behr et al. ............... | 360/121 |
| 5,759,681 A | * | 6/1998 | Hosoe et al. ............. | 428/332 |
| 5,815,342 A | * | 9/1998 | Akiyama et al. ......... | 360/97.01 |
| 5,879,783 A | * | 3/1999 | Chang et al. ............. | 428/141 |
| 6,280,813 B1 | | 8/2001 | Carey et al. | |
| 6,421,195 B1 | * | 7/2002 | Rubin et al. ............. | 360/48 |
| 6,500,567 B1 | * | 12/2002 | Bertero et al. .......... | 428/667 |
| 2001/0051287 A1 | * | 12/2001 | Kikitsu et al. .......... | 428/694 ML |
| 2002/0150793 A1 | * | 10/2002 | Maeda et al. ........... | 428/694 TM |
| 2002/0191320 A1 | * | 12/2002 | Coffey et al. ........... | 360/59 |
| 2003/0022025 A1 | * | 1/2003 | Futamoto et al. ........ | 428/694 TM |
| 2003/0108721 A1 | * | 6/2003 | Fullerton et al. ........ | 428/195 |

FOREIGN PATENT DOCUMENTS

JP 04-003324 A * 1/1992

OTHER PUBLICATIONS

JPO Abstract Translation of JP 04–003324 A (Doc. ID JP 04003324 A).*
J. C. Slonczewski, "Origin of Biquadratic Exchange in Magnetic Multilayers (invited)", Journal of Applied Physics, vol. 73, No. 10, May 15, 1993, pp. 5957–5962.

* cited by examiner

*Primary Examiner*—Kevin M. Bernatz
(74) *Attorney, Agent, or Firm*—Oblon, Spivak, McClelland, Maier & Neustadt, P.C.

(57) ABSTRACT

A magnetic recording medium capable of alleviating thermal fluctuation and improving the recording density includes a functional layer (12) containing a magnetic material, and a recording layer (11) overlying the functional layer and containing a magnetic material. The recording layer contains a plurality of magnetic grains (51) and a nonmagnetic material (52) existing among the magnetic grains, and the functional layer and the recording layer exert exchange coupling interaction in a direction making a substantially orthogonal relation with each other at the room temperature.

4 Claims, 18 Drawing Sheets

MAGNETIC RECORDING MEDIUM INCLUDING FUNCTIONAL AND RECORDING LAYERS ORTHOGONALLY EXCHANGE COUPLED

CROSS-REFERENCE TO RELATED APPLICATIONS

This application is based upon and claims the benefit of priority from the prior Japanese Patent Application No. 2001-197771, filed on Jun. 29, 2001; the entire contents of which are incorporated herein by reference.

BACKGROUND OF THE INVENTION

This invention relates to a magnetic recording medium, magnetic recording apparatus and magnetic recording method, and more particularly, to a magnetic recording medium, magnetic recording apparatus and magnetic recording method capable of higher-density recording than conventional recording by suppressing thermal fluctuation.

Along with recent progress of computers in processing speed, there is a continuous demand on higher speeds and higher densities also of hard disk drives (HDDs). Increase of the density, however, is physically limited, and this is an issue whether the techniques can continuously meet such request or not.

Magnetic recording mediums for substantially recording information have a magnetic layer comprising of minute magnetic grains. For high-density recording, magnetic domains recorded on the magnetic layer must be small enough. To enable clear distinction of small recording magnetic domains, the boundaries of the magnetic domains should be smooth enough, and this results in the reduction of the size of the magnetic grains. The propagation of magnetization reversal among the grains distorts the domain boundary. Therefore, individual magnetic grains need to be isolated magnetically by nonmagnetic substances to prevent exchange coupling interaction among the magnetic grains. Moreover, the magnetic layer must be thin enough for the high-density recording, from the viewpoint of the magnetic interaction between the magnetic head and the recording medium.

To satisfy those requirements, the unit volume of the magnetization reversal (whose size becomes almost equal to that of a magnetic grain as more and more of those requirements are met) must be decreased more and more as the density increases. However, if the magnetization reversal unit is diminished, then the magnetic anisotropy energy of the unit (Ku (density of magnetically anisotropy energy)×V (volume of the magnetization reversal unit)) becomes smaller than the thermal fluctuation energy, and it will be no longer possible to maintain the domains. This is the "thermal fluctuation phenomenon", and the physical limit of recording density mainly governed by this phenomenon is called "thermal fluctuation limit".

Magnetization reversal by thermal fluctuation can be prevented if the magnetic anisotropy energy density Ku is increased. However, since the recording coercivity Hcw is approximately proportional to Ku, magnetic recording is impossible even by the state-of-art recording head, which can generate the highest magnetic field in the world.

Increasing the volume V of the magnetization reversal unit is another way. However, increase of the size of magnetic grain along the plane of the medium is against the requirement of the high-density recording. In addition, when V is increased by increasing the thickness of the medium, the recording field from the head cannot reach a full-depth of the medium and fails to reverse the magnetization. Here again, high-density recording is not possible.

As discussed above, conventional magnetic recording mediums involve the problem that enhancement of the density encounters a limit caused by the thermal fluctuation phenomenon.

BRIEF SUMMARY OF THE INVENTION

According to an embodiment of the invention, there is provided a magnetic recording medium comprising: a functional layer containing a first magnetic material; and a recording layer stacked on said functional layer and containing a second magnetic material, said functional layer and said recording layer exerting exchange coupling interaction in a direction making a substantially orthogonal relation with each other under the room temperature.

In the recording medium having the above-summarized configuration, the recording layer and the functional layer magnetically reverse independently from each other, while the recording layer and the functional layer are magnetically continuous. This results in increasing the effective volume of the magnetization reversal unit of the recording layer and alleviation of thermal fluctuation. At the same time, by recording information in both the recording layer and the functional layer, so-called dual-value recording is enabled, which results in doubling the recording density.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings.

DETAILED DESCRIPTION OF THE INVENTION

Some embodiments of the invention will now be explained below with reference to the drawings.

(First Embodiment)

First explained is the first embodiment of the invention, which is a magnetic recording medium having the basic characteristics of the invention.

Figure 1:
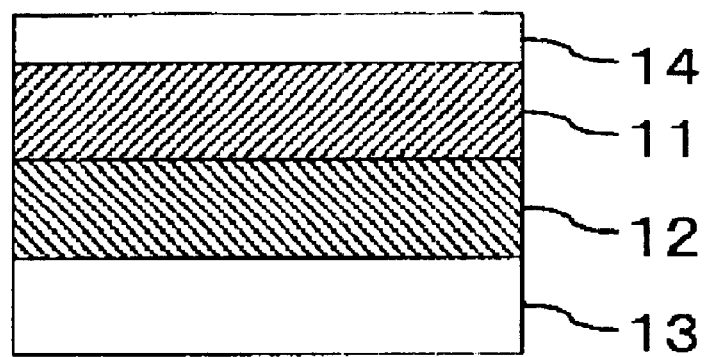
FIG. 1 is a schematic diagram that shows a cross-sectional structure of a magnetic recording medium according to an embodiment of the invention.

FIG. 1 is a schematic diagram that shows a cross-sectional structure of the magnetic recording medium according to an embodiment of the invention. The magnetic recording medium shown here includes a functional layer 12, recording layer 11 and a protective layer 14 that are sequentially stacked on a substrate 13.

The functional layer 12 and the recording layer 11 each contain a magnetic material, and the direction of their magnetic moments has a peculiar relationship.

Figure 2:
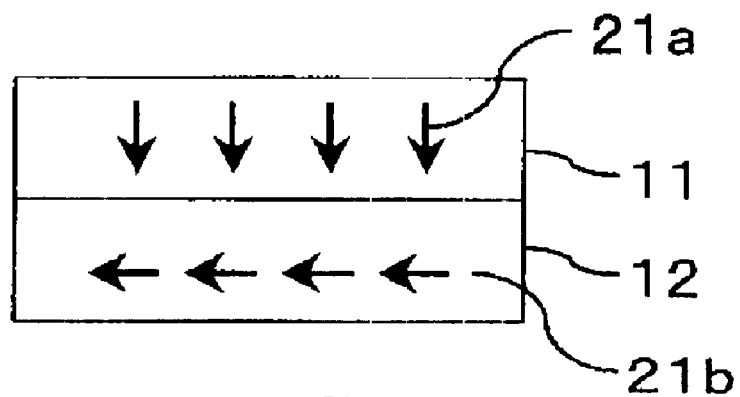
FIG. 2 is a schematic diagram for explaining an orientation relationship of magnetic moments in a recording layer 11 and a functional layer 12.

FIG. 2 is a schematic diagram for explaining this orientation relationship of magnetic moments in a recording layer 11 and a functional layer 12. Here are shown only the recording layer 11 and the functional layer 12 extracted from the magnetic recording medium to show a concept of orientations of moments (spins) therein. For easier understanding, here is taken an example in which the functional layer 12 is an in-plane magnetization film where the magnetization direction is in parallel to the major plane thereof whereas the recording layer 11 is a perpendicular magnetization film where the magnetization direction is perpendicular to the major plane. As shown here, spins 21a in the recording layer 11 and spins 21b in the functional layer 12 are oriented substantially orthogonal. That is, the recording layer 11 and the functional layer 12 are stacked to exert their exchange coupling interaction substantially in relatively orthogonal directions.

Figure 3:
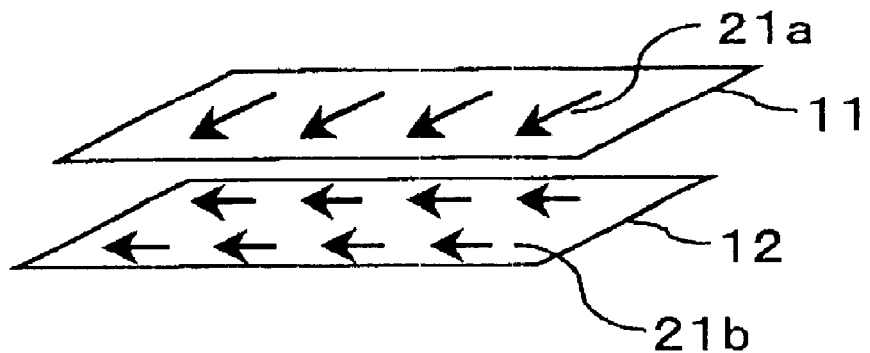
FIG. 3 is a schematic diagram that shows an orthogonal exchange coupling relationship between the recording layer 11 and the functional layer 12, both of which are magnetized along the film plane.

FIG. 3 is a schematic diagram that shows an orthogonal exchange coupling relationship between the recording layer 11 and the functional layer 12 both configured to be magnetized in parallel to their planes. Though the directions of the in-plane spins 21a and 21b are set arbitrary, the spins 21a in the recording layer 11 and the spins 21b in the functional layer 12 are substantially oriented in relatively orthogonal directions.

FIGS. 4A through 4H are schematic diagrams that show orientation relationships of spins between the recording layer 11 and the functional layer 12.

Figure 4A:
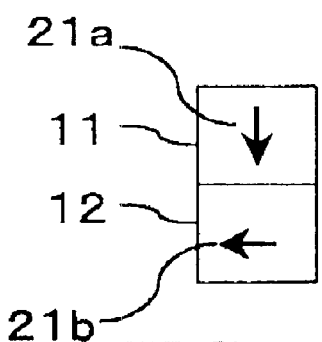
FIGS. 4A through 4H are schematic diagrams that show orientation relationships of spins between the recording layer 11 and the functional layer 12.
Figure 4B:
Figure 4C:
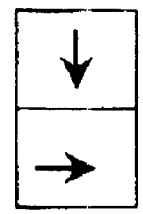
Figure 4D:
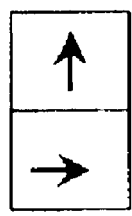
Figure 4E:

In the relative orientations shown in FIG. 4A and FIG. 4B, the magnetized state of the recording layer 11 of FIG. 4A is reversed from that of FIG. 4B. However, the energy of the functional layer 12 is absolutely the same in these two cases. Also in the case shown in FIGS. 4A and 4C where the functional layer 12 reverses in magnetized state, the energy of the functional layer 12 is absolutely the same. The relation stands also between FIG. 4C and FIG. 4D and between FIG. 4B ad FIG. 4D.

More specifically, magnetization reversal of the recording layer 11 exercises absolutely no influences on the energy state of the functional layer 12. Similarly, magnetization reversal of the functional layer 12 exercises absolutely no influences on the energy state of the recording layer 11. However, the upper and lower layers are magnetically continuous due to the exchange coupling interaction between the spins 21a and 21b.

Figure 4F:
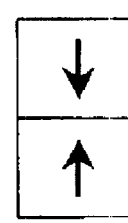

When the layers are under ferro exchange coupling, under which no independent reversal occurs, energy increases in the case of FIG. 4F. As a result, either the functional layer 12 or the recording layer 11 reverses, otherwise a magnetic domain wall is formed along their interface (also under anti-ferro exchange coupling, although their orientation relation is opposite).

Figure 4G:
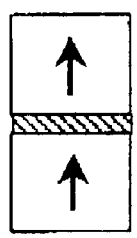
Figure 4H:
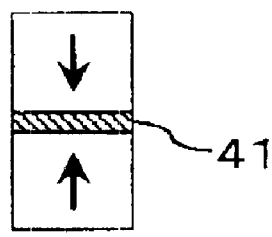

A magneto-static coupling double layer is another example of independent reversal This is shown in FIGS. 4G and 4H in which a nonmagnetic layer 41 is interposed between the recording layer 11 and the functional layer 12 to prevent exchange coupling. In this case, magnetization reversal of the recording layer 11 and the functional layer 12 are independent from each other similarly to FIGS. 4A, 4B, 4C and 4D. In this case, however, the upper and lower layers are not magnetically continuous.

Those two features, namely, (1) the recording layer 11 and the functional layer 12 being capable of magnetization reversal independently and (2) the recording layer 11 and the functional layer 12 being magnetically continuous, lead to important effects for the magnetic recording medium according to the embodiment of the invention.

Thermal fluctuation acts on the magnetization reversal unit. Therefore, if the volume of the magnetization reversal unit is large, then the thermal fluctuation is small. The magnetization reversal unit of ordinary HDD media is a group of magnetic grains under strong exchange coupling. In case of the magnetic recording medium according to the embodiment of the invention, the volume of the reversal unit is effectively the product of the "thickness" of both the recording layer 11 and the functional layer 12 and the "area" where magnetic reversal occurs. Therefore, the same thermal fluctuation state as that of a conventional medium is established when the total thickness of the recording layer 11 and the functional layer 12 is equal to the thickness of a conventional medium, provided the area of the magnetization reversal in the medium is equal.

Since spins of the recording layer 11 and those of the functional layer 12 can reverse independently without affecting one another, two-value recording, with one value in the recording layer 11 and the other value in the functional layer 12, is possible. If the recording layer 11 and the functional layer 12 are equal in the area of magnetization reversal unit, the recording density is doubled. That is, according to the embodiment of the invention, while keeping influences of thermal fluctuation unchanged, the recording density can be doubled. In case the area of magnetization reversal is doubled while maintaining the same recording density, the thermal stability coefficient $(K_uV)/(k_BT)$ is doubled, and the medium becomes very strong against thermal fluctuation.

The area of magnetization reversal unit is defined by the grain size of the magnetic crystal in case of ordinary HDD mediums. The grain size of the magnetic crystal should be controlled by the manufacturing process parameters. On the other hand, the magnetic recording medium according to the embodiment of the invention can be readily doubled in recording density only by adding the step of inserting an intermediate layer causing orthogonal exchange coupling or the step of modifying the interface, for example.

Now referring to FIG. 1, configuration of respective layers of the recording medium according to the embodiment of the invention will be explained in detail.

The magnetic recording medium shown here can be formed on a substrate that may be in any of various forms, such as circular disks, rectangular cards, and so on.

The substrate 13 may be made of a metal, glass, ceramics, organic material, or the like.

The recording layer 11 can be made of magnetic grains. Advantageous materials of the magnetic grains are those having a large saturation magnetization Is and a large magnetic anisotropy. From this viewpoint, usable as a magnetic metal material is at least one metallic material selected from the group consisting of, for example, cobalt (Co), platinum (Pt), samarium (Sm), iron (Fe), nickel (Ni), chromium (Cr), manganese (Mn), bismuth (Bi), aluminum (Al) and alloys of these metals.

Among those materials, alloys having Co element and having a crystal magnetic anisotropy, especially those based on CoPt, SmCo and CoCr, and regular alloys like FePt, CoPt, etc., are preferable. More specifically, Co—Cr, Co—Pt, Co—Cr—Ta, Co—Cr—Pt, Co—Cr—Ta—Pt, $Fe_{50}Pt_{50}$, $Fe_{50}Pd_{50}$, $Co_{50}Pt_{50}$, $Co_3Pt_1$, and the like, are preferable.

The material can be also selected from a wider range including, beside those materials mentioned above, other alloys of rare earth materials and transition metals, such as Tb—Fe, Tb—Fe—Co, Tb—Co, Gd—Tb—Fe—Co, Gd—Dy—Fe—Co, Nd—Fe—Co and Nd—Tb—Fe—Co, multi-layered films of magnetic layers and noble metal layers (such as Co layer/Pt layer and Co layer/Pd layer), semimetals such as PtMnSb, for example, and magnetic oxides such as Co ferrite and Ba ferrite, for example.

For the purpose of controlling the magnetic property, the above-mentioned magnetic materials may be alloyed with at least one element selected from Fe and Ni. Alternatively, it is also acceptable to add to those metals or alloys an additive for improving the magnetic property, such as chromium (Cr), niobium (Nb), vanadium (V), tantalum (Ta), titanium (Ti), tungsten (W), hafnium (Hf), indium (In), silicon (Si), boron (B), manganese (Mn), or the like, or a compound of any of these elements and at lest one element selected from oxygen (O), nitrogen (N), carbon (C) and hydrogen (H).

The magnetic anisotropy may be any of perpendicular magnetic anisotropy, in-plane magnetic anisotropy, or their mixture.

Thickness of the recording layer 11 can be determined adequately, depending on the desired recording density and structure of the magnetic head. For high-density recording, the thickness is preferably limited not to exceed 100 nm, more preferably not to exceed 50 nm, and more preferably not to exceed 20 nm. If the thickness is decreased to 0.1 nm or less, it will be difficult to form a continuous thin film.

Next explained is the functional layer 12.

Material of the functional layer 12 may be any magnetic material exhibiting ferromagnetic, antiferromagnetic, or ferrimagnetic properties.

In case a ferromagnetic material is used, the same materials as those of the recording layer 11 are usable. However, if the functional layer 12 need not function to record information, magnitude of the magnetic anisotropy and magnitude of magnetization may be smaller, and material thereof can be selected from a wider range than that of the recording layer 11.

On the other hand, as a material exhibiting antiferromagnetism, there is a thin film of an antiferromagnetic material having a Neel temperature higher than the room temperature. Examples of this material are alloys of iron (Fe), chromium (Cr) and cobalt (Co), such as Mn—Ni, Mn—Pd, Mn—Pt, Cr—Pd, Cu—Mn, Au—Mn, Au—Cr, Cr—Mn, Cr—Re, Cr—Ru, Fe—Mn, CO—Mn, Fe—Ni—Mn, Co—Mn—Fe, Ir—Mn, and the like.

Ordered alloys, such as AuMn, ZnMn, FeRh, FeRhIr, $Au_2Mn$, $Au_5Mn_{12}$, $Au_4Cr$, NiMn, PdMn, PtMn, PtCr, $PtMn_3$, $RhMn_3$, and the like, are also usable as the material of the functional layer 12. In addition, anit-ferromagnetic materials such as $Mn_3Pt$—N, CrMnPt, PdPtMn, NiO, CoO, and the like, are also acceptable.

As materials exhibiting ferrimagnetisms, alloy thin films combining amorphous rare earth elements and transition metals such as Tb—Fe, Tb—Fe—Co, Tb—Co, Gd—Tb—Fe—Co, Gd—Dy—Fe—Co, Nd—Fe—Co and Nd—Tb—Fe—Co, and thin films of ferrimagnetic materials of ordered alloys such as $CrPt_3$ can be used.

On the other hand, structures artificially made to exhibit antiferromagnetism or ferrimagnetism can be used as well. For example, in multi-layered films of magnetic substances (Co, Ni, Fe and their alloys) and nonmagnetic substances (such as Ru, Re, Rh, Ir, Tc, Au, Cu, Mn, Si, Cr and their alloys or oxides), in case the nonmangetic substance layer is thinner than 5 nm, and especially thinner than 1 nm, exchange coupling interaction in the antiferromagnetic direction may act between magnetic layers to make the entirety behave as an antiferromagnetic layer or ferrimagnetic layer (provided respective magnetic layers are different in thickness and magnetic moment).

The direction of magnetic anisotropy may be any of the in-plain direction, perpendicular direction and intermediate direction relative to the thin film. Thickness of the functional layer 12 may be determined appropriately, taking a balance with other layers into consideration. However, the functional layer 12 had better be thinner than 1000 nm because, if not, it will take much time for fabrication and will be subject to deterioration in property and exfoliation due to the film stress. Additionally, the functional layer 12 had better be thicker than 0.1 nm because it is difficult to make such a thin film continuously.

Exchanging coupling between the recording layer 11 and the functional layer 12 can be realized by successive deposition of films without breaking the vacuum in a typical process of manufacturing mediums using sputtering.

In case a substantially nonmagnetic substance is provided in a space between the recording layer 11 and the functional layer 12, the thickness of the nonmagnetic substance is preferably less than 5 nm. The "substantially nonmagnetic substance" herein pertains to any material other than those that are nonmagnetic when isolated but are magnetic when they contact a magnetic substance. Examples that are not "substantially nonmagnetic substances" are Cr, Mn, Pd, Pt, and the like.

When different magnetic films are stacked between the recording layer 11 and the functional layer 12, it is effective to control the exchange coupling. Therefore, as far as the effect of the embodiment of the invention is ensured, a plurality of magnetic layers and/or substantially nonmagnetic layers may exist between the recording layer 11 and the functional layer 12. The interface between the recording layer 11 and the functional layer 12 need not be in form of a continuous film, but may be defects, voids, local oxide film/grains, or a modified portion of the surface.

In the context of this specification, the substantially orthogonal exchange coupling interaction pertains to exchange coupling interaction under which the moments of the recording layer 11 and the functional layer 12 are forced to be aligned in orientation when they make approximately 90 degrees. An example of this kind of relation is a perpendicular/in-plane combination of magnetization. Even when both layers are in-plane magnetization, a combination of the radial direction and the circumferential direction of the disk or a combination of a plus 45-degree direction and a minus 45-degree direction relative to the circumferential direction of the disk can be possible for example. Any of those combinations can be used in the magnetic recording medium according to the embodiment of the invention.

Possibility of such substantially orthogonal exchange coupling has been reported in, for example, J. C. Slonczewski: J. Appl. Phys., vol 73, p. 5957 (1993). It is reported that, although ordinary exchange coupling is parallel (ferro-coupling) or anti-parallel (anti-ferro-coupling), orthogonal exchange coupling arises, for example, when a Cr thin film is used as an intermediate layer or when a conflict of ferro-coupling and anti-ferro-coupling occurs.

Almost all reports on the orthogonal exchange coupling are concerned in parts of GMR (giant magnetoresistance effect) reproducing elements used in HDD head. For example, one is on a discovery of orthogonal components in a exchange coupling during investigating an abnormality appearing in a GMR operations, another is on the measurement of a special samples prepared for clarification of the mechanism of the orthogonal coupling. So far as the Inventors know, there have been no reports about positive use of that phenomenon for improving the performance of devices or making use of it in new devices. The Inventors have found through unique experiments, simulation and theoretic analysis that the phenomenon is applicable to magnetic recording medium, which is not related technically to heads. Operations thereof have been already explained herein.

Orthogonal exchange coupling interaction may coexist with ferro coupling or anti-ferro coupling. If its intensity (usually described in $J/cm^2$, where J is the areal density of energy) is in a similar order, then the magnetic recording medium according to the embodiment of the invention can operate successfully. If the energy density of orthogonal exchange coupling is larger than ferro coupling or anti-ferro coupling, it will be advantageous for easier attainment of operations of the embodiment of the invention and larger effects thereof. However, freedom in selecting materials and processes will be diminished as compared with the case where they coexist with the same order of intensity. Therefore, the choice of the intensities of these interactions should be made in accordance with the specification of a desired magnetic recording medium.

On the other hand, an under layer, not shown, may be provided in any portion, such as between the substrate 13 and the functional layer 12. Material of the under layer may be either magnetic or nonmagnetic. The under layer is not particularly limited in thickness; however, it will be advantageous to limit the thickness not to exceed 500 nm for the purpose of preventing too much increase of the manufacturing cost.

In case a magnetic material is used as the under layer, it can be magnetically coupled to magnetic domains and the recording/reproducing head via exchange interaction or magnetostatic interaction for the purpose of ensuring efficient recording and reproduction of the recording medium. For example, in case the recording layer 11 is a perpendicularly magnetized film, high-density recording is ensured by using a soft-magnetic under layer with a single pole type magnetic recording head. In case the recording layer 11 is an in-plane magnetized film, if a soft-magnetic layer is provided on or under the recording layer 11 and a magnetic field intensive enough to saturate the soft-magnetic layer is applied upon reproduction, then it enables high-density recording and enhances the resistance to thermal fluctuation.

The use of a nonmagnetic material as the under layer is advantageous for controlling the crystallinity of the magnetic or nonmagnetic layers or preventing intrusion of impurities from the substrate. For example, if the under layer has a lattice constant near that of the desired crystal orientation of the magnetic layer, the crystallinity of the magnetic layer can be controlled. If the under layer is amorphous, it is possible to control the crystalline or amorphous property of the magnetic or nonmagnetic portion according to its surface energy.

A further under layer may be provided under the under layer. In this case, functions can be assigned to these two layers to enhance their effects. For example, a seed layer of a small grain size may be provided on the substrate 13 for the purpose of downsizing the crystal grains of the recording layer 11, and the under layer may be provided thereon to control the crystalline property of the recording layer 11. If it is especially desired to prevent intrusion of impurities from the substrate 13, a thin film with a small lattice constant or closely packed atomic structure may be used as the under layer.

Alternatively, an under layer having both the function of the magnetic under layer and the nonmagnetic under layer may be used. That is, a magnetic under layer which is also capable of controlling the crystal property of the magnetic layer, for example, can be used. This is more preferable because the effect of recording/reproducing property and the crystal property are multiplied.

The under layer used in the embodiment of the invention may be a modification of the surface of a layer by ion plating, exposing in specific gases, neutron irradiation, or the like. These methods are advantageous for facilitating fabrication of the medium by omitting the process of forming a thin film.

(Second Embodiment)

Next explained is the second embodiment of the invention, which is a magnetic recording medium in which both the functional layer and the recording layer have in-plane magnetic anisotropy, and the axis of the magnetic anisotropy of one of these layers is oriented substantially radially of the disk while the axis of the others is oriented substantially in the circumferential direction of the disk.

Figure 5A:
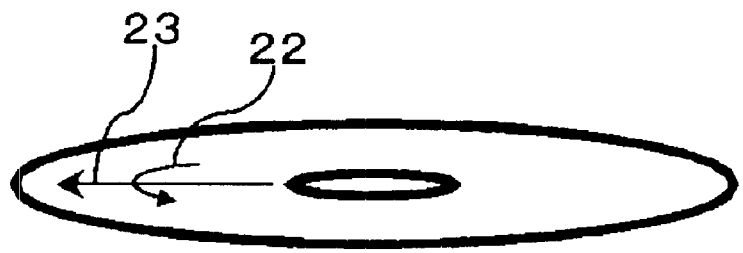
FIG. 5A shows a disk-type recording medium.
Figure 5B:
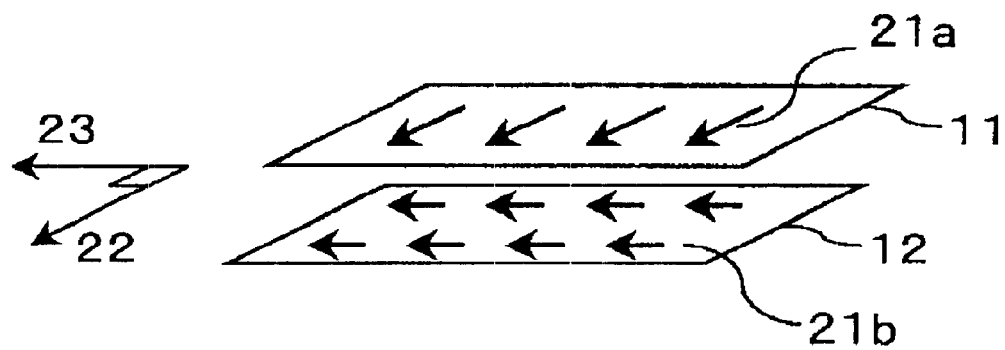
FIG. 5B shows both the recording layer 11 and the functional layer 12 both of which have the in-plane magnetic anisotropy.

FIGS. 5A and 5B are schematic diagrams that show the substantial part of the magnetic recording medium according to the second embodiment of the invention. In this embodiment, in case of assuming a disk-type recording medium as shown in FIG. 5A, both the recording layer 11 and the functional layer 12 have the in-plane anisotropy as shown in FIG. 5B. As to the relationship between spins 21a, 21b, spins 21a of the recording layer 11 align substantially in parallel to the circumferential direction 22 of the disk medium, and the spins 21b of the functional layer 12 align substantially in parallel to the radial direction 23 of the disk medium.

The opposite relationship is also acceptable. That is, the spins 21a of the recording layer 11 may align substantially in parallel to the radial direction of the disk medium whereas the spins 21b of the functional layer 12 align substantially in parallel to the circumferential direction 22 of the disk medium.

All the currently available HDDs employ in-plane magnetic recording. However, perpendicular magnetic recording is not yet employed although it is under vigorous researches because of its high potential toward higher densities. This situation is due to the need of drastic changes of the entire system. For example, the substantial design of the magnetic head should be changed to ensure efficient recording and reproduction. The signal processing system will also need significant changes.

The same situation may also arise when the magnetic recording medium according to the embodiment of the invention is employed. Therefore, it is desirable to use in-plane magnetized films as the recording layer and the functional layer.

This does not mean that the magnetic anisotropy of each layer must be absolutely free from perpendicular magnetization components. It is sufficient that the orientation of the direction of magnetic anisotropy is substantially parallel to the plane. That is, directions of magnetization of the recording layer 11 and the functional layer 12 may be aslant from the film plane within a certain extent.

This embodiment configured to orient the magnetic anisotropy of one of the layers in the radial direction of the disk and the magnetic anisotropy of the other layer in the circumferential direction of the disk is more desirable for a reason related to the moving direction of the magnetic head.

Current HDD systems use a magnetic head movable in the circumferential direction of a disk, and the recording/reproducing element is formed in the direction of the movement of the head or in the direction orthogonal to the head movement. That is, for recording and reproduction, it is preferable to set the direction of the width of magnetic domains to the radial or circumferential direction of the disk because changes of the system about the head may be small.

The degree of orientation of the axis of the magnetic anisotropy is usually described in "orientation ratio (OR)". The ratio of coercive force between the circumferential direction and the radial direction of the disk is used as OR. In case of the current HDD media, OR more than about 1.1 is enough to obtain an improvement of recording density (this increases the magnetic anisotropy energy in the circumferential direction and prevents the acceleration of the thermal fluctuation by the demagnetizing field generated at the magnetization transition region). Therefore, also in the magnetic recording medium according the embodiment of the invention, OR of the recording layer 11 and the functional layer 12 is preferably 1.1 or more.

Since an increasing OR is effective for increasing the density even with a current medium, addition of the effect of the embodiment of the invention by preventing thermal fluctuation is advantageous for attaining higher densities.

To increase OR, however, an additional effort is needed in the process, such as texturing the substrate or under layer, oblique sputtering, or the like. Therefore, this magnetic recording medium is especially useful when employed to a system in which the increase of the cost by the contrivance of the process is immaterial.

(Third Embodiment)

Next explained is the third embodiment of the invention that is a magnetic recording medium in which one of the recording layer and the functional layer has an in-plane magnetic anisotropy whereas the other has a perpendicular magnetic anisotropy.

Configuration of the substantial part of the magnetic recording medium according to this embodiment is as shown in FIG. 2, for example. One of the recording layer 11 and the functional layer 12 has a in-plane magnetic anisotropy, and the other has a perpendicular magnetic anisotropy. The magnetic anisotropy of any of these layers need not be strictly in-plane or perpendicular to the medium plane. That is, perpendicularly magnetized components may be contained in the layer having the in-plane anisotropy, and in-plane magnetized components may be contained in the layer having the perpendicular magnetic anisotropy, provided orientation of the anisotropic magnetization is substantially in-plane or perpendicular.

The perpendicularly magnetized film is advantageous because it can be easily obtained by controlling the crystal property of the magnetic layer (such as a cobalt (Co)-system magnetic thin film of an hcp (hexagonal close-packed) structure) by employing an under layer so that the c-axis of the magnetic layer be preferably oriented perpendicular to the film surface. In addition, alloys of amorphous rare earth-transition metals also exhibit a perpendicular magnetic anisotropy depending on the growth direction of a thin film, and are usable to easily form a perpendicularly magnetized film. The perpendicularly magnetized film can be readily obtained also by alternately stacking some cycles of approximately 1 nm thick layers of magnetic films of cobalt (Co), for example, and noble metal layers of platinum (Pt) or palladium (Pd), for example.

In case of the in-plane-magnetized film, circumferentially or radially directed orientation as discussed above is not indispensable. For these reasons, the magnetic recording medium according to this embodiment of the invention is advantageous for easier fabrication. Furthermore, in case the in-plane-magnetized film has a certain orientation (large OR), it is more preferable because the effect of increasing the density thereby is added.

As already explained, for using a part of the perpendicular-magnetized film for recording/reproduction of information, the system needed some changes. Therefore, it is recommended to choose in-plane/in-plane combination, in-plane/perpendicular combination or perpendicular/in-plane combination depending on the property of the system used and comparing advantages and defects thereof.

(Fourth Embodiment)

Next explained is the fourth embodiment of the invention that is a magnetic recording medium in which the functional layer is a continuous magnetic material.

The magnetic recording medium shown here has the characteristics already explained in conjunction with the first embodiment, and is characterized in the use of a continuous magnetic material as the functional layer 12.

The "continuous magnetic material" means that the same concept as "magnetic continuity" of the recording layer 11 and the functional layer 12 already explained with reference to FIG. 4 holds also in the direction in-plane to the film.

Figure 6:
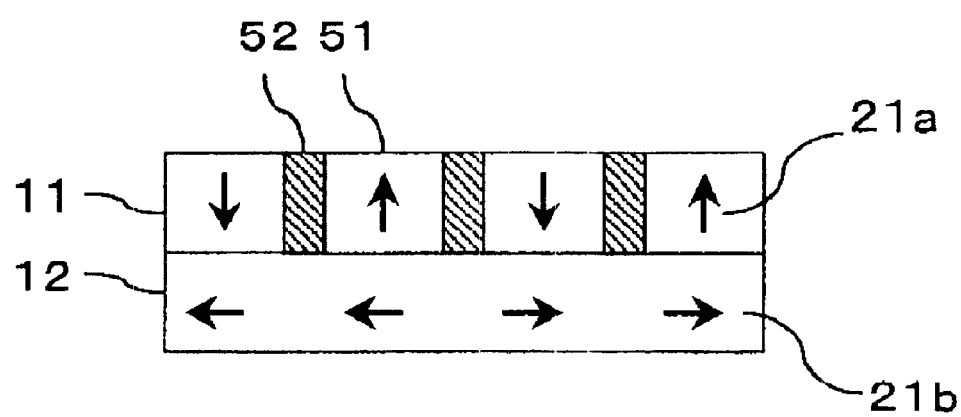
FIG. 6 is a schematic diagram that shows the configuration of spins in the recording layer and the functional layer in a magnetic recording medium according to the fourth embodiment of the invention.

FIG. 6 is a schematic diagram that shows an aspect of spins in the recording layer and the functional layer in the magnetic recording medium. In this example, the recording layer 11 has a perpendicular magnetic anisotropy, and the functional layer 12 has an in-plane magnetic anisotropy. To cope with high-density magnetic recording, the recording layer 11 is made up of magnetic grains 51 and a nonmagnetic portion 52 separating it similar to that of a current HDD medium. The functional layer 12, however, has no structure isolating the magnetic material.

In the recording layer 11, magnetization reversal takes place at each magnetic grain 51 as the minimum reversal unit. If the volume V of the magnetic grain is decreased for higher density, thermal fluctuation is accelerated. However, since the recording layer 11 and the functional layer 12 are magnetically continuous as explained before, the volume of the reversal unit V is the total of the volume of the magnetic grain 51 and the volume of the continuous part of the functional layer 12. In case the functional layer 12 is made of an alloy of a rare earth-transition metal, the functional layer 12 is continuous over the entire surface of the disk. Therefore, here is obtained the very large effect that the volume of the reversal unit V becomes substantially infinite and the problem of thermal fluctuation is removed. Additionally, since the magnetization reversal of the recording layer 11 gives absolutely no influences to the magnetized state of the functional layer 12, it never happens that the magnetic continuity of the functional layer disturbs recording/reproduction operation.

Also when the recording layer 11 and the functional layer 12 are under ferro coupling or anti-ferro coupling, the effect of increasing the volume V is similarly obtained. However, since the direction of the spins of the functional layer is changed by that of the recording layer, stable recording/reproducing operation is not possible.

Although the functional layer 12 of the embodiment of this invention has been explained above as not being in charge of recording, it may be a continuous magnetic film such as rare earth-transition metal alloys and may be a system that forms a magnetic domain walls as the recording of information. This is advantageous for more improvement of the recording density because multi-value recording is possible as already explained in conjunction with the first embodiment.

In the instant embodiment, continuity of the magnetic material in the functional layer 12 need not extend over the entire disk surface. That is, as apparent from the foregoing explanation, it is sufficient that the continuity increases the thermal stability coefficient $(K_uV)/(k_BT)$ as much as preventing thermal fluctuation in the magnetization reversal unit of the recording layer 11. Therefore, the functional layer 12 may have a magnetic property and a microstructure exhibiting a thermal stability coefficient $(K_uV)/(k_BT)$ of approximately 80 or more when estimated independently. It is therefore possible to use an alloy of a rare earth-transition metal, so-called network medium having an isolated nonmagnetic portion in a continuous magnetic material, or magnetic multi-grain thin film of a large grain size.

(Fifth Embodiment)

Next explained is the fifth embodiment of the invention, which is a magnetic recording medium in which the functional layer is made up of magnetic grains and a nonmagnetic material among them.

Figure 7:
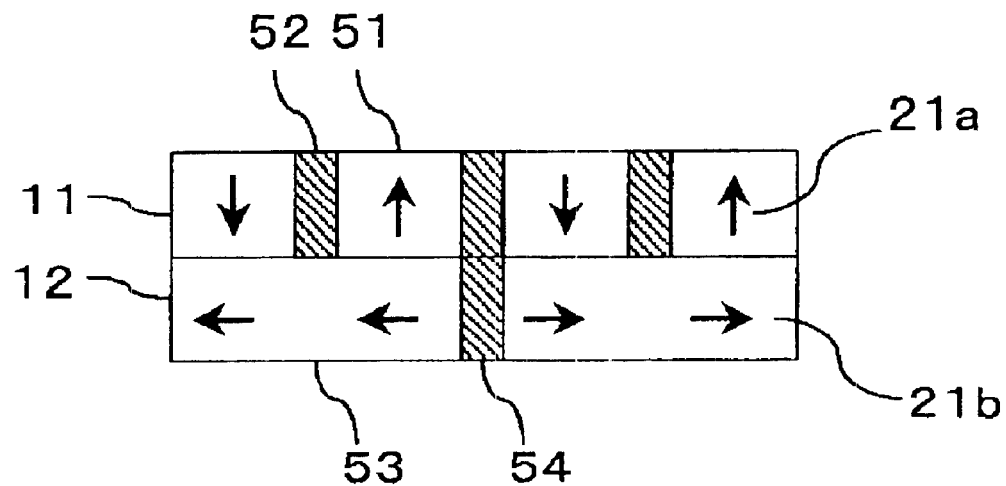
FIG. 7 is a schematic diagram that shows a cross-sectional structure of a magnetic recording medium according to the fifth embodiment of the invention.

FIG. 7 is a schematic diagram that shows a cross-sectional structure of the substantial part of the magnetic recording medium according to the fifth embodiment. In this embodiment, the functional layer 12 contains magnetic grains 53 and a nonmagnetic material 54, and exhibits a structure where the magnetic grains 53 are magnetically isolated due to the existence of the nonmagnetic material 54. The size of the magnetic grains 53 of the functional layer 12 is preferably larger than the size of the magnetic grains 51 of the recording layer 11.

It is advantageous for obtaining a magnetic recording medium with a higher density to add the effect of preventing thermal fluctuation by an increase of the magnetization reversal units V in addition to the effect of preventing the issue of thermal fluctuation by multi-value recording. The embodiment shown here can efficiently increase the magnetization reversal unit V and alleviate thermal fluctuation by sizing the magnetic grains 53 of the functional layer 12 larger than the magnetic grains 51 forming the recording layer 11.

In case of the structure shown in FIG. 7, the size of the magnetic crystal grains 53 of the functional layer 12 is double the size of the magnetic grains 51 of the recording layer 11. This kind of micro structure can be realized by choosing appropriate process parameters, such as changing the sputtering pressure, employing materials having different crystal lattice spaces, or inserting a modified layer, not shown, along their interface, for example.

In this embodiment, since the recording density of the functional layer 12 cannot be increased, density enhancement by multi-value recording is slightly sacrificed. Instead, however, it is excellent in density enhancement by preventing thermal fluctuation by the improvement of the thermal stability coefficient $(KuV)/(k_BT)$.

For magnetically separating the magnetic grains 53 of the functional layer 12 by the nonmagnetic material 54, there is a method of precipitating a nonmagnetic material, such as chromium (Cr), tantalum (Ta), boron (B) among the magnetic grains 53, oxide represented by silicon dioxide $(SiO_2)$ or nitride, among the magnetic grains 53. Also employable is an artificial processing using a technique used for manufacturing semiconductors, such as lithography. Another alternative is a self-organization technique using a self-organizing di-block copolymer such as PS-PMMA as a mask. Processing by ion beam irradiation is also acceptable.

Curren HDD mediums are made up of a thin film containing magnetic grains and a nonmagnetic material scattered among them. Therefore, systems or magnetic heads are designed to be optimized for high-density recording on, or efficient reproduction from, such a thin film. It is preferable to use this head system in this embodiment of invention, since the recording/reproducing operation is easily optimized.

Also a process for fabricating a thin film made up of magnetic grains and a nonmagnetic material scattered among them has been progressed. Therefore, if a under layer capable of controlling the crystal property and simultaneously controlling the microstructure is used, for example, both the functional layer and the recording layer can be easily fabricated simultaneously. The instant embodiment is more preferable because the currently available technique can be used easily.

(Sixth Embodiment)

Next explained is the sixth embodiment of the invention, which is a magnetic recording medium providing a predetermined space layer between the functional layer and the recording layer.

Figure 8:
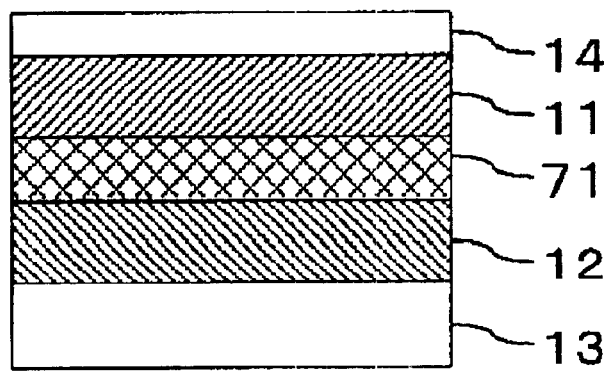
FIG. 8 is a schematic diagram that shows a cross-sectional structure of a magnetic recording medium according to the sixth embodiment of the invention.

FIG. 8 is a schematic diagram that shows a cross-sectional structure of the magnetic recording medium according to the sixth embodiment. The same components as those already explained in conjunction with FIGS. 1 through 7 are labeled with common reference numerals, and their detailed explanation is omitted here.

The magnetic recording medium according to this embodiment includes a spacer layer 71 between the functional layer 12 and the recording layer 11. The spacer layer 71 functions the role of bringing the functional layer 12 and the recording layer 11 into orthogonal exchange coupling or maintaining it.

Material of the spacer layer 71 may be either magnetic or nonmagnetic. Alternatively, the material itself may be a composite material combining a plurality of different kinds of materials. Further, the spacer layer 71 may be a multi-layered film as well. That is, the spacer layer 71 may be formed by using any appropriate material and structure from various candidates, which can induce or maintain orthogonal exchange coupling interaction between the recording layer 11 and the functional layer 12.

In case of ferro coupling or anti-ferro coupling, if a nonmagnetic material such as a noble metal is used as the material of the spacer layer 71, it is expected that exchange coupling interaction can be maintained between the functional layer 12 and the recording layer 11 by controlling the thickness of the spacer layer 71 within about 3 nm.

In contrast, orthogonal exchange coupling used in the embodiment of the invention is considered to occur due to reasons independent from or in conjunction with those factors. One of the reasons is the mechanism that a material, although nonmagnetic when isolated, undergoes magnetic polarization when contacting with a magnetic material, and induces orthogonal exchange interaction. In this case, unlike the ferro or anti-ferro coupling, orthogonal exchange interaction may occur even with a longer distance.

Also when the spacer layer 71 is magnetic, it can induce orthogonal exchange interaction. In case the spacer layer 71 is a magnetic layer, it affects the recording/reproducing process. Therefore, its thickness had better be moderate, and it is preferably limited not to exceed 5 nm. It is more preferably limited not to exceed 3 nm.

Material of the spacer layer 71 used in this embodiment may be manganese (Mn), chromium (Cr) or alloy of any of them.

The Inventors conducted a number of experiments to find out a spacer layer 71 capable of inducing orthogonal exchange interaction between the recording layer 11 and the functional layer 12. As a result, they could find that any of Cr, Mn and their alloys used as the spacer layer material brings about a large orthogonal exchange interaction.

It has been already reported that orthogonal interaction can be obtained with Cr or Mn (M. E. Filipkowski, J. J. Kerbs, G. A. Prinz, and C. J. Gtierrez: Phys. Rev. Lett., vol. 75, p. 1847 (1945)). However, it was prepared by vapor deposition under ultrahigh vacuum, called MBE (molecular beam epitaxy) in a small chip sample, and the orthogonal relationship obtained was only in in-plane/in-plane combinations.

The Inventors improved this result, and has found that orthogonal exchange coupling can be realized also in the sputtering method, which is used for mass production of HDD media. The Inventors have also found that, as compared with other material of the spacer layer 71, the above-proposed materials can more uniformly induce orthogonal exchange interaction over the entire surface of a disk having the diameter of 3.5 inches. Furthermore, the Inventors first found orthogonal exchange coupling induced in in-plane/perpendicular combinations in these material systems.

A possible mechanism of Cr or Mn causing orthogonal exchange interaction may rely upon the magnetic polarization occurring at the interface and spiral spin alignment in the spacer layer. In addition, since this embodiment uses a sputtering method, in which the energy of particles that form thin film is large, magnetic polarization might be promoted by the diffusion of particles at the interface.

Alternatively, material of the spacer layer 71 in this embodiment may be any of materials using a nonmagnetic material and containing at least one element selected from cobalt (Co), iron (Fe), nickel (Ni), manganese (Mn), chromium (Cr), platinum (Pt) and palladium (Pd).

The Inventor has confirmed through his own experiment that large orthogonal exchange interaction is obtained between the functional layer 12 and the recording layer 11 when at least one element selected from Co, Fe, Ni, Mn, Cr, Pt and Pd is added to the nonmagnetic spacer layer. Also when any of these materials was used as the spacer layer 71, orthogonal exchange interaction was confirmed to be uniform over the entire surface of a 3.5-inch disk, and those materials are acceptable for use as the magnetic recording medium.

It is not so clear why those elements, added, induce orthogonal exchange interaction. However, it may rely on the interaction mediated by spins of minor elements in the spacer layer.

The Inventor has found that, when magnetic elements are added, if the added quantity exceeds 45 atomic %, or if the added elements aggregate to form large grains and thereby change the spacer layer 71 into a magnetic material, then the orthogonal exchange interaction is weakened. This result supports the foregoing presumption. Therefore, if a magnetic element such as Co. Fe or Ni is added, its amount is preferably limited not to exceed 45 atomic %, and more preferably not to exceed 15 atomic % at which aggregation is unlikely to occur. In case the added quantity was less than 0.01 atomic %, the clear effect of inducing orthogonal exchange interaction could not be obtained.

As to elements other than magnetic elements, no upper limits in quantity to be added have been found. This is apparent also from the fact that the spacer layer of Mn, for example, is effective for inducing orthogonal exchange interaction.

Regarding nonmagnetic materials usable as the matrix of the spacer layer 71, at least when ruthenium (Ru), rhenium (Re), rhodium (Rh), iridium (Ir), technetium (Tc), gold (Au), copper (Cu) and silicon (Si) were used respectively, large orthogonal exchange coupling was attained.

In the instant embodiment, one or both of the interface between the spacer layer 71 and the functional layer 12 and the interface between the spacer layer 71 and the recording layer 11 are preferably rough to an extent.

The Inventors conducted a number of experiments to find out a spacer layer 71 capable of inducing orthogonal exchange interaction between the recording layer 11 and the functional layer 12. In the course of repeating experiments by changing sputtering conditions and the power supplied to targets, intensive orthogonal exchange interaction was confirmed when one or both of the interface between the spacer layer 71 and the functional layer 12 and the interface between the spacer layer 71 and the recording layer 11 were as rough as 0.5 nm in average.

Here again, orthogonal exchange interaction was confirmed to be uniform over the entire surface of a 3.5-inch disk in diameter, and it was confirmed sufficiently acceptable for magnetic recording mediums. The degree of roughness referred to here is the value obtained by scanning by AFM (atomic force microscopy) the surface of the functional layer 12 made under the same condition or the surface of the spacer layer 71 deposited thereon and conducting numerical processing to the result. Actually, the functional layer 12, spacer layer 71 and recording layer 11 were formed consecutively under conditions making previously known surface roughness and observed by cross-sectional TEM (transmission electron microscopy). As a result, it was confirmed that the same surface roughness could be obtained. This means that the roughness of the interface can be estimated by cross-sectional TEM as well.

It is not so clear why the roughness of the interface enhances orthogonal exchange interaction. However, changes of magnetic polarization by mutual diffusion of elements along the interface and/or conflicts of exchange interactions may be a part of the reasons.

In the embodiment shown here, the spacer layer 71 may have an island-like or mesh-like structure.

Figure 9:
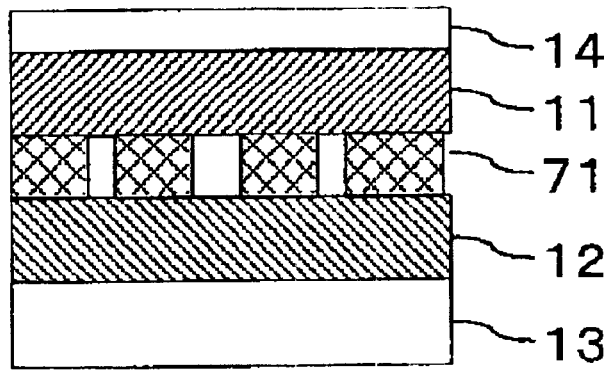
FIG. 9 is a schematic diagram that shows a cross-sectional structure of a magnetic recording medium having an island-like or mesh-like structure of a spacer layer 71.

FIG. 9 is a schematic diagram that shows a cross-sectional structure of a magnetic recording medium having such an island-like or mesh-like structure of a spacer layer 71. The same components as those already explained in conjunction with FIGS. 1 through 8 are labeled with common reference numerals, and their detailed explanation is omitted here.

As shown in FIG. 9, the spacer layer 71 is isolated and has the lost portions 91 where the spacer layer 71 is locally lost.

This structure was found in the Inventors experiments while repeating experiments by variously changing the sputtering condition, power to the target or thickness of the spacer layer 71. Through these experiments, the spacer layer 71, having an island-like or mesh-like structure, was proved to induce large orthogonal exchange interaction. Here again, orthogonal exchange interaction was confirmed to be uniform over the entire surface of a 3.5-inch disk in diameter, and it was confirmed sufficiently acceptable for magnetic recording mediums.

Figure 10:
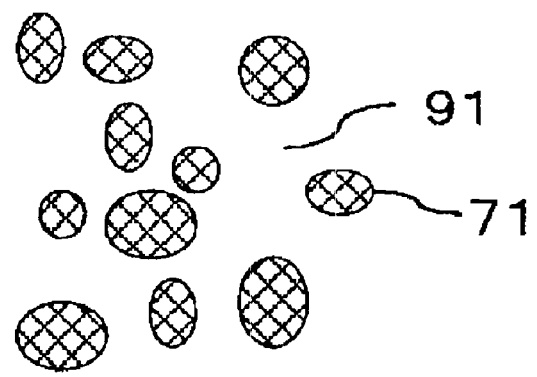
FIG. 10 is a schematic diagram that shows a plan view of the island-like structure of the spacer layer 71.

FIG. 10 is a schematic diagram that shows a plan view of the island-like structure of the spacer layer 71.

Figure 11:
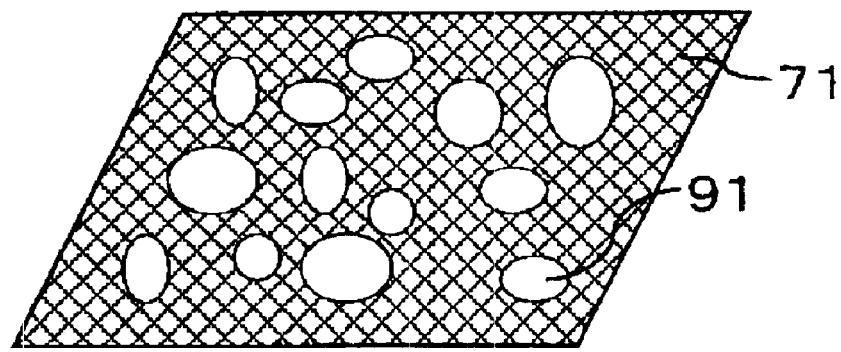
FIG. 11 is a schematic diagram that shows a plan view of the mesh-like structure of the spacer layer 71.

FIG. 11 is a schematic diagram that shows a plan view of the mesh-like structure of the spacer layer 71.

In any of these structures, the spacer layer 71 has lost portions 91. In each lost portion 91, the functional layer 12 and the recording layer 11 are presumed to be adjacent. The structures as shown in FIGS. 10 and 11 were revealed by cross-sectional TEM of a plurality of sections. However, it could not be confirmed whether the functional layer 12 and the recording layer 11 were in complete contact in the lost portions 91 of the spacer layer 71. It is presumed that a mixture of elements of both layers and elements of the spacer layer exists in the lost portions 91.

When the size of the "island" in an island-like structure or the size of the "mesh" in a mesh-like structure was smaller than 0.5 nm, no effect of orthogonal exchange interaction was confirmed. If the size of the island or mesh exceeds 50 nm, it may undesirably cause unevenness of orthogonal exchange interaction among magnetization reversal units of the recording layer.

It is not so clear why orthogonal exchange interaction occurs when the spacer layer 71 has an island-like or mesh-like structure. A mechanism similar to the above-explained effect given by "roughness" of the spacer layer 71 may act. Additionally, there may be the possibility that an effect of mixture of materials of the functional layer 12, recording layer 11 and spacer layer 71 was superposed.

In the embodiment shown here, an interface layer having an island-like or mesh-like structure may be provided on the interface between the spacer layer 71 and the functional layer 12, interface between the spacer layer 71 and the recording layer, or both these interfaces.

Figure 12:
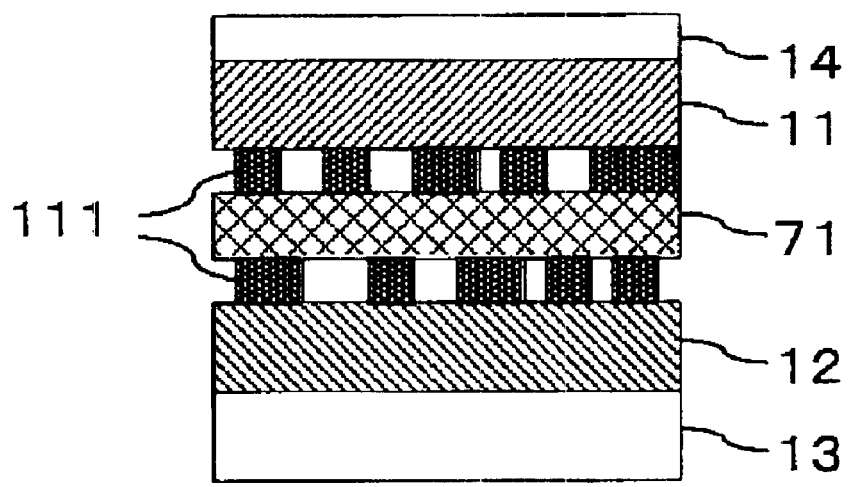
FIG. 12 is a schematic diagram that shows a cross-sectional structure of a magnetic recording medium having an interface layer.

FIG. 12 is a schematic diagram that shows a cross-sectional structure of a magnetic recording medium having such an interface layer. Here again, the same components as those already explained in conjunction with FIGS. 1 through 11 are labeled with common reference numerals, and their detailed explanation is omitted here.

FIG. 12 shows an example having interface layers 111 on the top and the bottom of the spacer layer 71. The island-like or mesh-like interface layer 111 partly contacts the functional layer 12 or recording layer 11. This structure was revealed by cross-sectional TEM of a plurality of sections.

Also this structure was found in the Inventors experiments while repeating experiments by changing the sputtering condition, power to the target or thickness of the spacer layer 71. Here again, orthogonal exchange interaction was confirmed to be uniform over the entire surface of a 3.5-inch disk in diameter, and it was confirmed sufficiently acceptable for use in magnetic recording mediums.

Material of the interface layer 111 may be the same as that used to form the functional layer 12, recording layer 11 or spacer layer 71, or may be of a material having a different composition therefrom. When the interface layer 111 is made of ruthenium (Ru), rhenium (Re), rhodium (Rh), iridium (Ir), technetium (Te), gold (Au), silver (Ag), copper (Cu), silicon (Si), iron (Fe), nickel (Ni), platinum (Pt), palladium (Pd), chromium (Cr), manganese (Mn) or aluminum (Al), especially prominent orthogonal exchange interaction was obtained.

The mechanism of induction of orthogonal exchange coupling by the use of the interface layer 111 is considered similar to the above-explained effect given by "roughness" of the interface, and it is highly possible that the mechanism is effective even when other materials other than the above-listed elements are used. Additionally, there is the possibility that an effect of mixture of materials of the functional layer 12, recording layer 11 and spacer layer 71 was superposed.

(Seventh Embodiment)

Next explained is the seventh embodiment of the invention, which is a magnetic recording medium in which the functional layer 12 is made or antiferromagnetic material or a ferrimagnetic material and opposite spins coexist along the interface.

Figure 13:
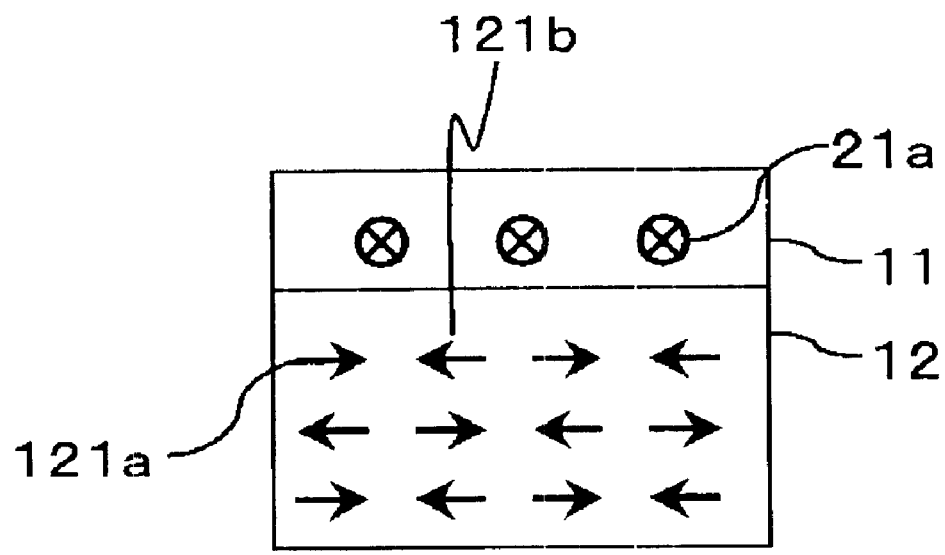
FIG. 13 is a schematic diagram that shows a cross-sectional structure of a magnetic recording medium according to the seventh embodiment of the invention.

FIG. 13 is a schematic diagram that shows a cross-sectional structure of the substantial part of the magnetic recording medium according to the seventh embodiment. The figure shows a part of the functional layer 12 and the recording layer 11, and shows that both spins 121a and 121b coexisting in the functional layer 12 appear along the interface.

Figure 14:
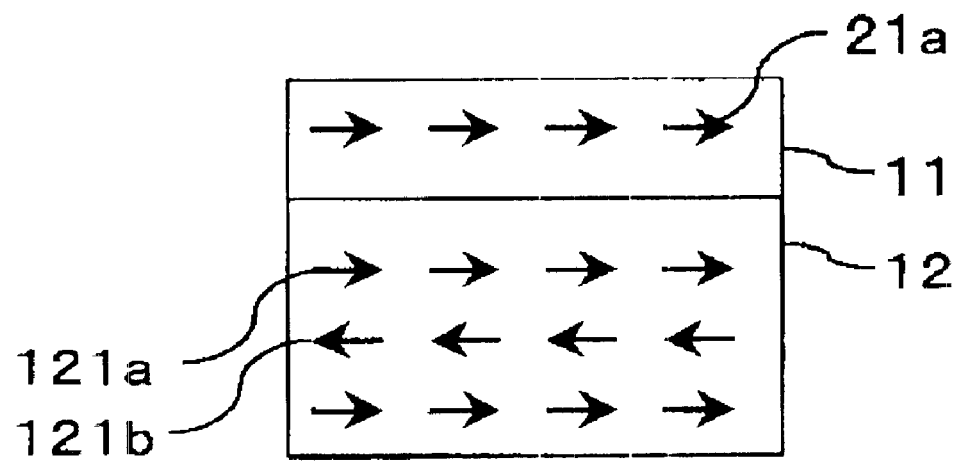
FIG. 14 is a schematic diagram of the case when only the spins 121a are in the interface. Spins 121a and 121b conflict each other in the functional layer 12.

FIG. 14 is a schematic diagram showing, for the purpose of comparison, that only spins 121a is on the interface of the functional layer 12, in which spins 121a and 121b coexist. Although FIGS. 13 and 14 show and example in which both the functional layer 12 and the recording layer 11 are magnetized in parallel to the plane, the same aspect will appear also in a perpendicular/perpendicular combination of magnetization. When both the competitive spins appear on the interface as shown in FIG. 13, large exchange interaction is obtained.

In case the functional layer 12 has ferrimagnetism or antiferromagnetism, oppositely oriented spins 121a, 121b are formed in the film. The "competitive spins" referred to here describe those spins 121a, 121b oriented in opposite directions. Alignment of the spins 121a, 121b existing on the interface can be adjusted by modifying the crystal axis of a material used as the functional layer 12 or through the magnetic and heat treatment.

It is not so clear which mechanism acts on noticeable orthogonal exchange coupling upon appearance of competitive spins along the interface. However, assuming the recording layer 11 and the functional layer 12 are in direct contact, ferro coupling and anti-ferro coupling compete at the interface. It can be the cause of bringing about orthogonal exchange interaction as an energy minimum condition.

This phenomenon could be reproduced not only when the functional layer 12 and the recording layer 11 were in direct contact, but also when the spacer layer 71 was provided as explained in conjunction with the sixth embodiment (Mn, Cr and their alloys, elements added, interface roughness, island-like spacer layer, island-like interface layer). Therefore, coexistence of the effect related to the spacer layer in the sixth embodiment and the effect of competitive spins in the instant embodiment is considered important for inducing orthogonal exchange coupling interaction.

(Eighth Embodiment)

Next explained is the eighth embodiment of the invention, which is a magnetic recording apparatus having inboard any of the magnetic recording mediums explained in conjunction with the first to seventh embodiments.

Figure 15:
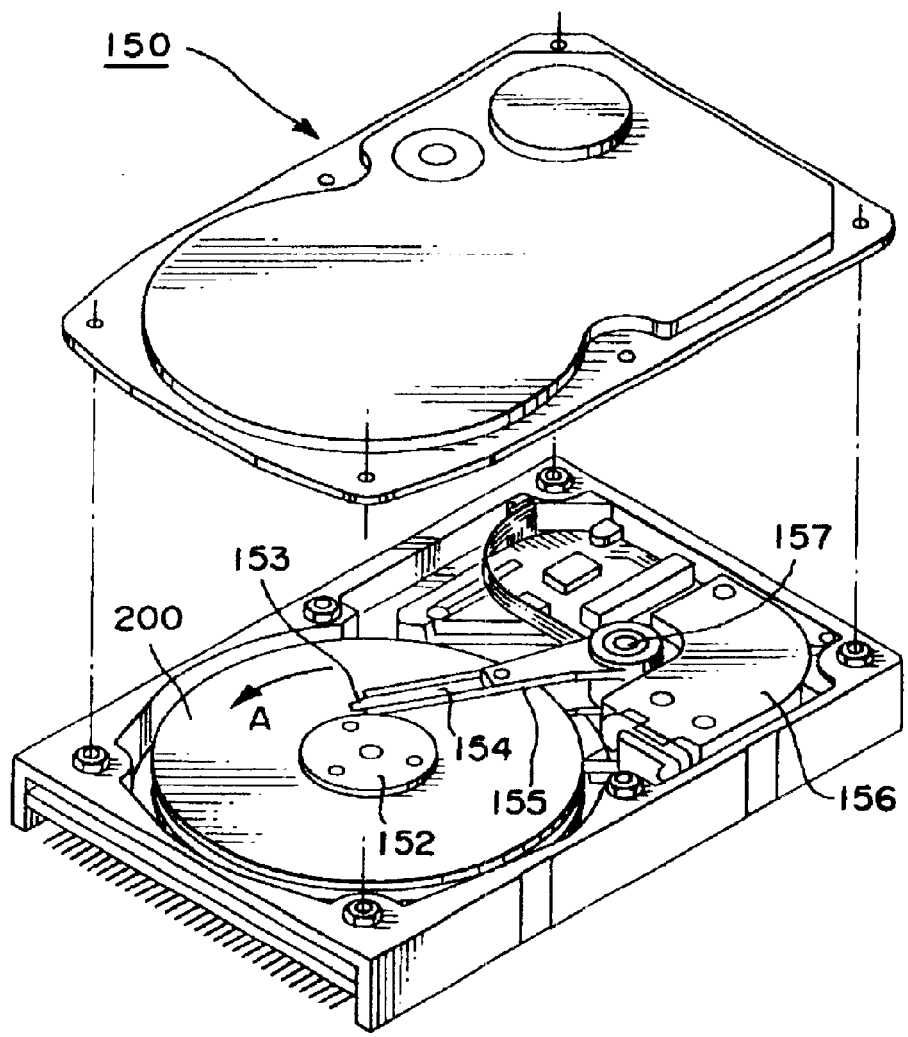
FIG. 15 is a perspective view of the substantial part of a magnetic recording apparatus according to an embodiment of the invention for the purpose of showing its outline configuration.

FIG. 15 is a perspective view that shows outline configuration of this kind of magnetic recording apparatus. The magnetic recording apparatus 150 shown here is of a type using a rotary actuator. A magnetic recording medium disk 200 is mounted on a spindle 152 and rotated in the arrow A direction by a motor, not shown, which is responsive to a control signal from a controller of a driving mechanism, not shown. The magnetic recording apparatus 150 shown here may have a plurality of medium disks 200 inboard.

A head slider 153 for carrying out recording and reproduction of information to be stored in the medium disk 200 is attached to the tip of a film-shaped suspension 154. The head slider 153 supports a magnetoresistance effect element or magnetic head, for example, according to one of the foregoing embodiments of the invention, near the distal end thereof.

Once the medium disk 200 rotates, the medium-faced surface (ABS) of the head slider 153 is held floating by a predetermined distance above the surface of the medium disk 200. Also acceptable is a so-called "contact-traveling type" in which the slider contacts the medium disk 200.

The suspension 154 is connected to one end of an actuator arm 155 having a bobbin portion for holding a drive coil, not shown, and others. At the opposite end of the actuator arm 155, a voice coil motor 156, a kind of linear motor, is provided. The voice coil motor 156 comprises a drive coil, not shown, wound on the bobbin portion of the actuator arm 155, and a magnetic circuit made up of a permanent magnet and an opposed yoke that are opposed to sandwich the drive coil.

The actuator arm 155 is supported by ball bearings, not shown, which are located at upper and lower two positions of the spindle 157 and driven by the voice coil motor 156 for rotating, sliding movements.

Figure 16:
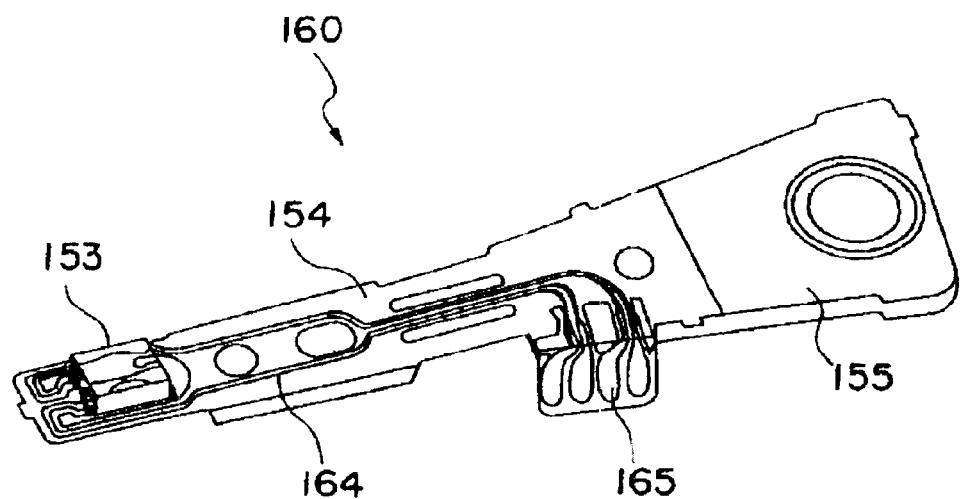
FIG. 16 is a perspective view of a magnetic head assembly at the distal end from an actuator arm 155 involved, which is viewed from the disk.

FIG. 16 is a perspective view of a magnetic head assembly at the distal end from an actuator arm 155 involved, which is viewed from the disk. The magnetic head assembly 160 includes the actuator arm 155 having the bobbin portion supporting the drive coil, for example, and the suspension 154 is connected to one end of the actuator arm 155.

At the distal end of the suspension 154, a head slider 153 carrying the magnetic head is attached. The suspension 154 has a lead 164 for writing and reading signals, and the lead line 164 is connected to electrodes of the magnetic head incorporated in the head slider 153. Numeral 165 in FIG. 15 denotes an electrode pad of the magnetic head assembly 160.

In this embodiment, one of the magnetic recording mediums already explained in conjunction with the first to seventh embodiments is used as the medium disk 200, information magnetically recorded on the medium disk 200 under a higher recording density than before can be read reliably.

The magnetic recording medium (medium disk 200) according to an embodiment of the invention includes the functional layer 12 and the recording layer 11 to record information on both. Therefore, also in the magnetic recording apparatus 150 shown here is configured to reproduce information from both. The magnetic head for this purpose may include a reproducing element portion having a structure coping with different orientations of spins of the recording layer 11 and the functional layer 12. For example, in case of employing a perpendicular/in-plane combination of magnetization, a magnetic head having both an element for reproduction of perpendicular magnetization and an element for reproduction of in-plane magnetization may be prepared. If an element for reproduction of in-plane magnetization is usable also for reproduction of perpendicular magnetization, then it is sufficient to use a single reproducing element. These reproducing elements may be supported either on different sliders, not shown, or on a common slider as shown in FIG. 16. It will be advantageous from the viewpoint of the manufacturing cost to simultaneously build the reproducing elements on the common slider 153 in a common process.

As an alternatively method, it is possible to use a single reproducing element to simultaneously detect leak magnetic fields from both recording magnetic domains of the functional layer 12 and the recording layer 11 and thereby discriminate them by signal processing. This method is advantageous for reducing the number of parts for making up an element. For discrimination by signal processing, there are some methods, namely, changing the recording frequency, changing the modulation cord, and the like.

Even in case of a perpendicular/in-plane combination of magnetization, the leakage field from each divisional layer of recording domains is detected. Therefore, a single element for detection, i.e. a single yoke for detecting the leak magnetic field, may be commonly used. This is preferable for enabling the use of a reproducing element having the same configuration as that used for a single-layered magnetic recording medium. Also regarding the discrimination, in addition to the aforementioned method, it is possible to use the characteristics that the shape of reproduced signal from the perpendicularly magnetized film, when differentiated, becomes the shape of the reproduced signal from the in-plane-magnetized film. Since respective signals different in pattern have different frequency components, their filtering is easy. Additionally, different modulation cords can be used easily.

Figure 17:
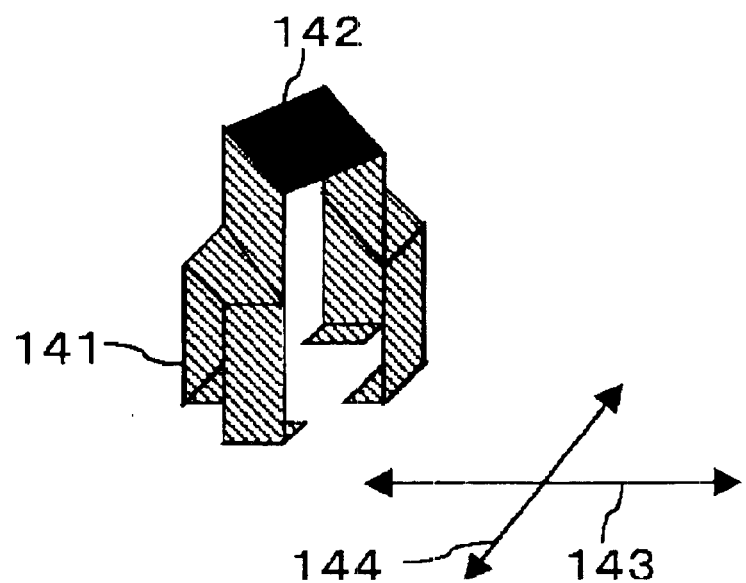
FIG. 17 is a diagram showing a concept of a reproducing element usable in an in-plane/in-plane combination of magnetization.

FIG. 17 is a diagram showing a concept of a reproducing element usable in a in-plane/in-plane combination of magnetization. The figure schematically shows extracted parts of the reproducing element, namely, a yoke portion 141 and a magnetic field detecting element 142 (such as GMR element). The yoke portion 141 is mainly made of a magnetic material to form a path permitting a leak magnetic field from the recording medium to efficiently path. The magnetic field detecting element 142 converts a magnetic field passing through the yoke portion 141 into electric signals, for example.

Arrows 143, 144 in the figure indicate orientations of spins in the functional layer and the recording layer of the recording medium. Terminal portions of the yoke portion 141 are preferably aligned with the orientation of the leak magnetic field generated by the medium (along the orientation of spins in most cases) to improve the magnetic field passing efficiency. The traveling direction of the recording medium (circumferential direction of the disk) may be independent from spins 143, 144; however, from the viewpoint of easier fabrication of the magnetic head, one of the spins 143, 144 is preferably oriented in the circumferential direction of the disk.

For high-density recording, the reproducing gap must be small. For this purpose, the gap of the medium-facing portion of the yoke must be small, and this makes it difficult to employ the configuration shown in FIG. 17.

Figure 18:
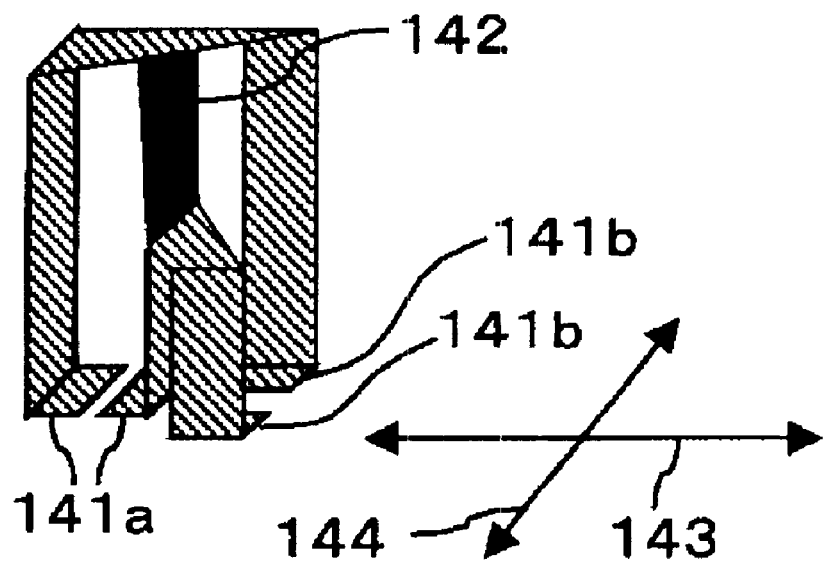
FIG. 18 is a diagram showing a concept of a magnetic reproducing element usable with a narrow track width.

FIG. 18 is a diagram showing a concept of the configuration of a magnetic reproducing element usable under this kind of situation. That is, in the reproducing element shown here includes a pair of yokes 141a aligned in the direction of the spin 143 and a pair of yokes 141b aligned in the direction of the spin 144. One of yokes in each pair is common to one of yokes in the other pair, and a magnetic field detecting element 142 is provided. Employment of this structure can simultaneously satisfy the requirement of a narrow gap.

The magnetic recording apparatus 150 according to the instant embodiment can be configured to record information in the functional layer and to include at least one element for recording.information in the recording layer.

In the above-explained magnetic recording apparatus that uses a head having at least one element to reproduce information of the functional layer and to reproduce information of the recording layer, the use of two recording heads is not indispensable because there is the possibility that ROM (read only memory) information, which need not be recorded by a user, is recorded in one of layers. Contents of such ROM information are various depending on the system used, and technical features can be added to the embodiment of the invention in accordance with the contents.

Not providing two magnetic recording heads is advantageous for preventing an increase of the cost and complication the apparatus. Since the resolution usually decreases as getting remoter from the reproducing head, in case the magnetic recording apparatus is configured for use in a system requesting a high density and a high transfer speed of ROM information, the ROM information had better be stored in the recording layer 11. In case the magnetic recording apparatus is configured for use in a system requesting a low density and a low transfer speed of ROM information, the ROM information had better be stored in the functional layer 12.

However, for providing a magnetic recording apparatus for use in a system requesting the full limit area as the user area, two recording elements for the recording layer and the functional layer, respectively, are preferably provided. If a single element can exercise both functions, the element may be only one. For example, in case of a perpendicular/in-plane combination of magnetization, a recording magnetic head having both an element for perpendicular recording and an element for in-plane recording may be prepared.

Alternatively, taking account of an example reported to use a ring head for perpendicular magnetic recording, a single ring head may be used for both perpendicular recording and in-plane recording. It is also possible to provide two ring heads. This configuration is advantageous because the manufacturing process is simplified and the magnetic recording medium need not include the soft-magnetic under layer.

These elements may be supported on different sliders or may be supported on a common slider 153 as shown in FIG. 16. From the viewpoint of the manufacturing cost, it is preferable to simultaneously build the elements at the same position in a common process.

The magnetic recording apparatus 150 according to the instant embodiment may be configured to record at least tracking information, servo information or address information in the functional layer 12 of the medium 200.

Requirements to be satisfied here by respective components of the magnetic recording apparatus 150 are the same as those already explained. However, the apparatus is characterized in that at least tracking information, servo information or address information is recorded in the functional layer 12. As already explained, the functional layer 12 of the medium 200 is remoter from the magnetic head than the recording layer 11, and high-density recording is more difficult than the recording layer 11.

In general, density of tracking information, servo information, address information and other like information may be lower (reference frequency may be lower) than the density of information as the contents to be recorded by a user. Therefore, storing at least these kinds of information in the functional layer 12 is greatly advantageous for effectively using the feature of the magnetic recording apparatus according to the instant embodiment. Even in this case, it is not necessary that user can write information in the functional layer 12. If a user can write information, this is advantageous for enabling the user to reset the physical format, etc. If the apparatus is so designed that the user cannot write information in the functional layer, this is preferable because the head configuration is simplified without the recording head for the functional layer and therefore lowers the cost.

(Ninth Embodiment)

Next explained is the ninth embodiment of the invention, which a magnetic recording method and a magnetic recording apparatus that use a heating means for heating the magnetic recording medium during recording to a recording temperature Tw satisfying the relation Tw>$T_{cE}$ with the temperature $T_{cE}$ exchange coupling interaction between the functional layer and the recording layer, which acts toward the direction making an orthogonal relation at the room temperature, disappears.

Here again, any of the magnetic recording media already explained in conjunction with the first to seventh embodiments can be used. Among the components of the magnetic recording apparatus according to the instant embodiment, most parts excluding the heating means of the magnetic recording medium are the same as those explained above in conjunction with the eighth embodiment.

Means for heating the recording layer 11 may be configured to heat the disk surface either entirely or locally provided the disk surface reaches the recording temperature only locally. Taking the archival property and the power consumption into consideration, it is usually preferable to locally heat the disk surface and maintain the remainder part of the medium at or near the room temperature. For quick and local heating, various schemes are usable, namely, using a laser like one used in an optical disk, inductive heating, irradiating an electromagnetic wave, moving a probe heated by a heat wire to an away from the medium, irradiating electron beams, and so on.

For more local heating, there are various schemes and methods, namely, a scheme of localizing laser beams on the medium surface by using lenses, etc., a scheme of changing laser beams (electromagnetic wave) to an evanescent light by using micro apertures or solid emulsion lenses, a scheme of making a micro antenna at the distal end of a probe and carrying out induction heating therefrom, a method of sharpening the medium-facing portion of a heating probe as sharp as possible or bringing the heating probe closer, and a method of sharpening the medium-facing portion of an electron beam emission probe as sharp as possible, for example. The heating device using any of these techniques may be located to face either the recording surface of the medium or the opposite surface.

The magnetic field can be applied by using a means having a magnetic circuit made up of an induction coil and a magnetic pole on an end surface of a floating slider 153, like one used in HDD shown in FIG. 15; placing a permanent magnet; adding a magnetic material layer in the medium to generate a momentary, local magnetic field under a temperature profile or a magnetization profile by irradiation of light; or using a leak magnetic field generated from the magnetic material layer itself in charge of information recording. In case of placing a permanent magnet, quick and high-density application of a magnetic field is enabled by a contrivance, such as varying the distance between the permanent magnet and the medium, or downsizing the magnet, for example.

In the instant embodiment, recording is carried out, keeping the medium heated to a higher temperature than the temperature $T_{cE}$ canceling orthogonal exchange coupling interaction between the functional layer 12 and the recording layer 11. Now therefore, a method for measuring the temperature $T_{cE}$ will be explained below.

The temperature $T_{cE}$ where exchange coupling interaction between the functional layer 12 and the recording layer 11 disappears can be found out by using a hysteresis loop, magnetic torque curve and its temperature dependency. In case of measuring the magnetic property with a vibrated sample magnetometer (VSM), it is necessary to keep the medium heated for approximately 10 minutes, and the temperature-raising speed cannot be increased. Therefore, this method results in holding the sample at that temperature for approximately one hour. If a thin film magnetic material is held at the high temperature for such a long time, irreversible changes may occur in the microstructure and may disable precise evaluation of the magnetic property. In case of alloys of amorphous rare earth-transition metals, such changes are less liable to occur. However, CoCrPt alloy mediums often used as HDD media may change in their microstructure around 200° C. In this case, changes of the magnetic property from the room temperature or a lower temperature to the temperature inviting the structural changes may be inserted in a high-temperature side. $T_{cE}$ in the magnetic recording device according to the instant embodiment may be a temperature where changes of the hysteresis loop or the torque curve due to existence of orthogonal exchange coupling do not appear substantially on the measuring device.

Existence of orthogonal exchange interaction as the guideline for determining $T_{cE}$ can be known by examining the hysteresis loop in the direction making the angle of 45 degrees with both orthogonal two spins in the plane where those spins exist, or by analyzing a torque curve.

Figure 19:
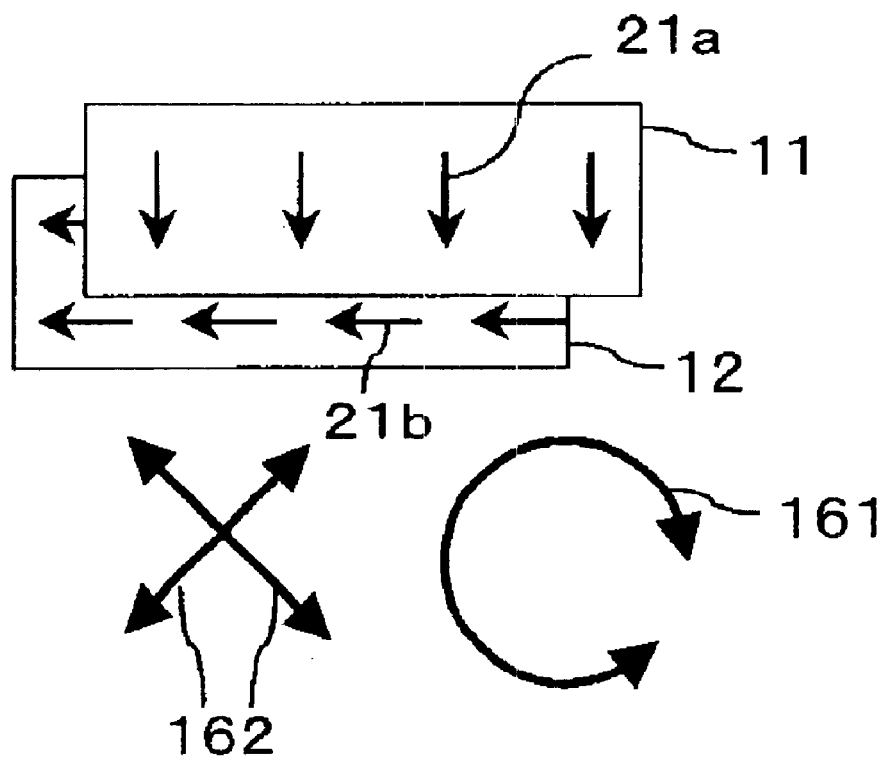
FIG. 19 is a schematic top-view of the recording medium that shows a concept of the substantial part of a magnetic recording medium with an in-plane/in-plane combination of magnetization according to an embodiment of the invention.

FIG. 19 is a top-view diagram that shows a concept of the substantial part of a magnetic recording medium with a in-plane/in-plane combination of magnetization according to an embodiment of the invention.

Figure 20:
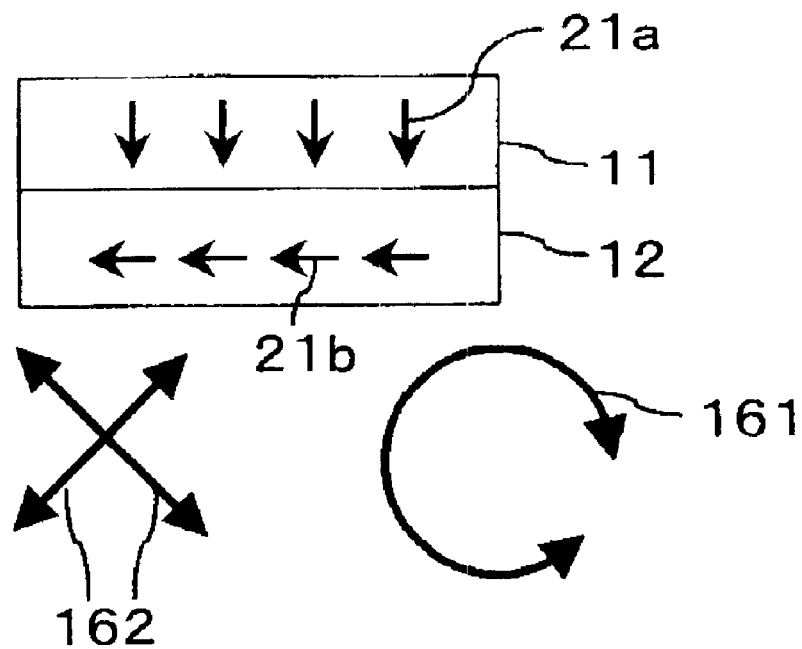
FIG. 20 is a diagram that shows, in a cross-sectional view, a concept of the substantial part of a magnetic recording medium with a perpendicular/in-plane combination of magnetization according to an embodiment of the invention.

FIG. 20 is a diagram that shows, in a cross-sectional view, a concept of the substantial part of a magnetic recording medium with a perpendicular/in-plane combination of magnetization according to an embodiment of the invention.

These mediums each include the recording layer 11 having spins 21*a*, and the functional layer 12 having spins 21*b*. For these layers, the measuring direction 161 of a torque curve and the measuring direction 162 of VSM are shown. Whichever hysteresis loop or torque curve is obtained under existence of orthogonal exchange interaction varies from case to case, and cannot be described definitely. However, here are obtained characteristics apparently different from characteristics without exchange coupling (simple superposition of independent hysteresis) or cases where only ferro coupling or anti-ferro coupling exists (which exhibit a property as a single-axis perpendicular film, in-plane film antiferromagnetic film or ferrimagnetic film). The extent of orthogonal exchange coupling can be found out by relatively simple simulation that calculates orientations of spins, which minimize the total magnetic energy. While measuring the hysteresis loop or torque curve with changing the temperature, when the characteristic property disappears, that temperature is $T_{cE}$.

Next referring to FIGS. 21 through 24, operations of the magnetic recording apparatus and the magnetic recording method according to the instant embodiment will be explained in greater detail.

Figure 21:
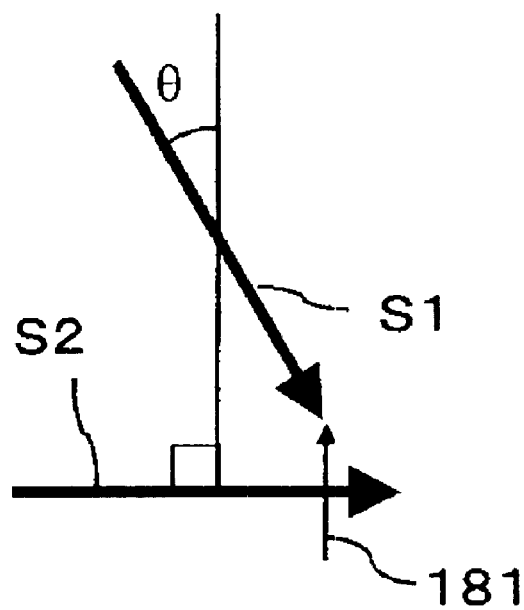
FIG. 21 is a diagram that shows a configuration of spins S1, S2.

FIG. 21 is a diagram that shows a configuration of spins S1, S2. In case the upper spin S1 is forced to reverse, reversal of the upper spin does not affect the direction of lower spin if orthogonal relation between both spins is hold. In case of FIG. 21, this corresponds to the reversal within the plane perpendicular to the sheet. In actual magnetic recording media, however, the direction of the recording field is not always applied along this direction.

For example, once an angle θ is produced between upper and lower spins S1, S2 as illustrated, the lower spin S2 receives the orthogonal force to its orientation as shown by the arrow 181. As a result, the recording layer 11 and the functional layer 12 cannot revere independently, and it may occur that reversal of the recording layer 11 causes a change of the spin in the functional layer 12 as well. In case the anisotropy energy of the lower spin S2 is extremely small, such a reversal process is easy to occur. In this case, a method of magnetization reversal by heating the medium to diminish the orthogonal exchange coupling interaction may be employed. Its mechanism will be explained below.

FIGS. 22A through 22D are diagrams that schematically show aspects of magnetization reversal in the recording layer 11 and the functional layer 12 in a cross-sectional structure of the magnetic recording medium. For convenience of explanation, here is shown a case in which the recording layer 11 has a perpendicular magnetization anisotropy whereas the functional layer 12 has a in-plane magnetization anisotropy. However, the following explanation is applicable to all possible combinations.

Assume here as the initial state that magnetization in the recording layer 11 is entirely oriented downward as shown in FIG. 22A. The process of next applying an upward magnetic field from the recording head and thereby forming recording magnetic domains having upward spins will be explained below. In the following explanation, consideration will be made about a process of causing reversal (recording process) by locally heating only the central part of three spins 21a. In this case, steps are proceeded with in the sequence from FIG. 22A to FIG. 22D to carry out recording.

That is, FIG. 22A shows the initial state under the room temperature (Ta).

Then, as shown in FIG. 22B, the medium is heated until the temperature of the heated portion 191 reaches the temperature $Tc_E$, where the exchange coupling is disappeared. That is, in this state, exchange coupling is lost between the functional layer 12 and the recording layer 11 in the heated portion 191.

At that time, however, the moment of the recording layer 11 or the functional layer 12 need not always disappear. For example, if the spacing between the functional layer 12 and the recording layer 11 is longer than the inter-atomic distance (or the distance between spins in anti-ferro magnetic coupling), inter-layer coupling between the functional layer 12 and the recording layer 11 is disappeared at a temperature lower than the temperature decoupling the moments in the functional layer 12. In this case, although both the functional layer 12 and the recording layer 11 have magnetization, there is no exchange coupling interaction between them.

It is also possible that exchange coupling interaction is as weak as substantially negligible. For example, when the recording magnetic field or the coercive force of the recording layer is in order of 100 Oe (oersted), if the exchange coupling force converted to the magnetic field, Hex, is in the order of 0.1 Oe, then the force can be disregarded in the magnetic recording apparatus and the magnetic recording method according to the embodiment of the invention.

In the next step, as shown in FIG. 22C, temperature of the medium is raised to the recording temperature Tw, and an upward magnetic field is applied from the recording head. In this state, since exchange coupling interaction is already lost, the recording layer 11 efficiently exercises magnetization reversal, tracing an arbitrary path determined by the applied magnetic field vector of the head. As a result, spins reorient upward as illustrated.

After that, as shown in FIG. 22D, temperature is lowered to the room temperature.

As explained heretofore, heating of the medium more efficiently enables magnetization reversal of the recording layer 11 only. This operation is similarly applicable also for reversing the functional layer 12 alone. Since the embodiment ensures efficient magnetization reversal, it is advantageous not only for enabling higher-density magnetic recording but also for increasing candidates of materials of the recording layer and the functional layer.

It is known that ferro coupling or anti-ferro coupling exchange interaction may exist simultaneously with orthogonal exchange interaction. When the magnetic recording operation is carried out under the room temperature, existence of such interaction is not so desirable for the embodiment of this invention. However, these interactions can bring effective magnetization reversal and result in the enhancement of the recording density when the medium is heated. Its mechanism will be explained below.

Figure 23:
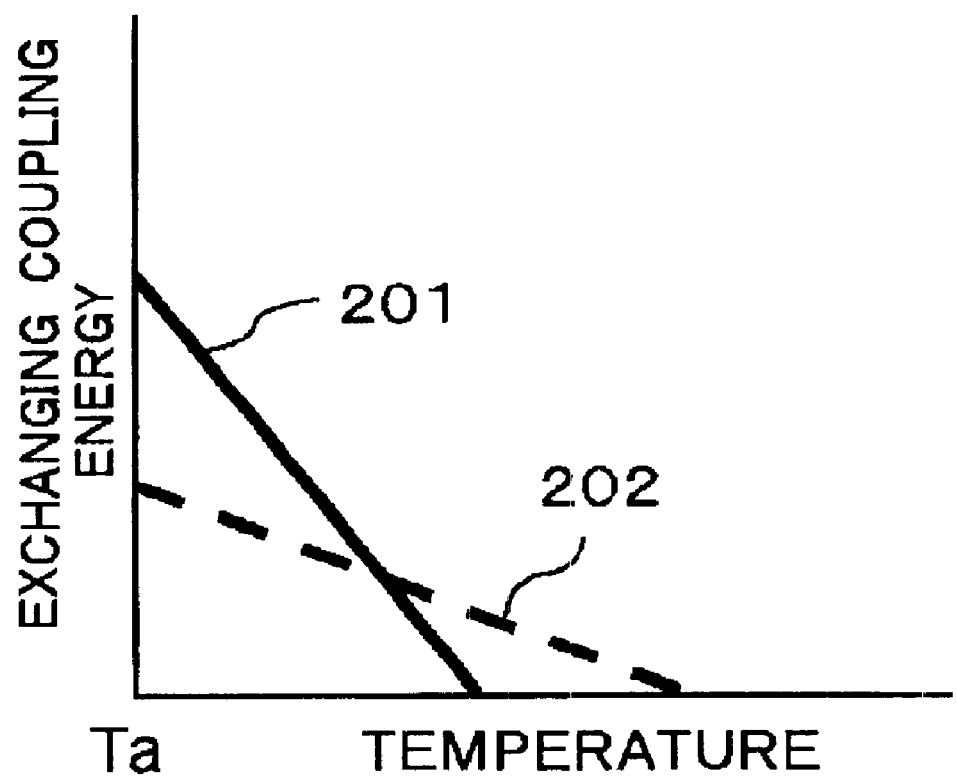
FIG. 23 is a diagram that schematically shows temperature dependency of orthogonal exchange interaction 201 and ferro or anti-ferro exchange interaction 202.

FIG. 23 is a diagram that schematically shows temperature dependency of orthogonal exchange interaction 201 and ferro or anti-ferro exchange interaction 202. The Inventors have found that ferro or anti-ferro exchange interaction disappears at temperatures sometimes higher and sometimes lower than the temperature $T_{cE}$. After further researches, the Inventors have got the knowledge that making the best use of this feature enables efficient magnetic recording. More specifically, under temperatures higher than $T_{cE}$, ferro or anti-ferro exchange interaction alone acts between spins, and the angle made by the spins becomes smaller than 90 degrees due to this exchange interaction. If the recording field is applied under the condition, the application direction of the magnetic field comes off the directions of the spins, and reversal takes place with a small energy.

FIGS. 24A through 24E are diagrams that show a concept of this process. That is, these figures illustrate cross-sectional structures of the magnetic recording medium and schematically show aspects of magnetization reversal in the recording layer 11 and the functional layer 12. Here again, the same components as those of FIGS. 1 through 23 are labeled with common reference numerals, and their detailed explanation is omitted here.

FIGS. 24A through 24E show the process of heating and reversing only the central spin among three spins (recording process) by applying an upward magnetic field from the recording head to the medium in which magnetization of the recording layer 11 is entire oriented downward as its initial state, and thereby producing recording magnetic domains having upward spins.

First, as shown in FIG. 24A, all spins are oriented at the room temperature (Ta).

Next as shown in FIG. 24B, the medium is locally heated until the temperature of the heated portion 192 reaches the temperature $T_{cE}$ where the orthogonal exchange coupling is substantially disappears.

Then, as shown in FIG. 24C, ferro coupling interaction forces the spin of the recording layer 11 re-orients in the same direction of the spins in the functional layer 12.

Next as shown in FIG. 24D, the medium temperature reaches the recording temperature Tw. Then, an upward magnetic field is applied from the recording head, not shown, the spin of the heated portion 192 reverses upward. At that time, since the spin of the recording layer 11 previously oriented in-plane (FIG. 24C), magnetization reversal takes place with a smaller energy than that required when the recording magnetic field is applied in the same direction as the orientation of the spin, such as in the process from FIG. 22B to FIG. 22C.

After that, as shown in FIG. 24E, when the medium is cooled to the room temperature, the spin is fixed.

As explained above, magnetization reversal is brought about more efficiently only in the recording layer 11 by heating the medium. This mechanism is applicable also when reversal is took place in the functional layer 12 or when the residual exchange interaction after lost of the orthogonal exchange interaction is anti-ferro interaction.

Since the instant embodiment can bring about magnetization reversal more efficiently, it is advantageous for ensuring higher-density magnetic recording and for increasing candidates of materials of the recording layer and the functional layer.

Heretofore, the first to ninth embodiments of the invention have been explained with reference to specific examples. Hereinbelow, embodiments of the invention will be explained in greater detail with reference to examples.

FIRST EXAMPLE

As the first example of the invention, detailed explanation is given below about an experiment for confirming the effect of preventing thermal fluctuation by orthogonal exchange coupling interaction in a structure including a spacer layer between the functional layer and the recording layer.

In this example, a magnetic recording medium having the cross-sectional structure shown in FIG. 8 was prepared.

More specifically, after depositing a 50 nm thick Pt under layer on a glass substrate (13) of 3.5 inches in diameter, and sequentially depositing thereon a 15 nm thick FePt—B functional layer (12), 0.4 nm thick Mn spacer layer (71), 15 nm thick CoPtCr recording layer (11) and 3 nm thick C protective layer (14), a lubricant was coated on the surface. Upon forming the FePt—B functional layer (12) the substrate was heated to approximately 400° C. As a result of this heating process, orientation of the magnetic anisotropy of the functional layer (12) stood up by 45 degrees relative to the substrate. On the other hand, the recording layer (11) became a in-plane-magnetized film.

All steps of forming layers were consecutively carried out without breaking the vacuum. By another experiment, this condition was confirmed to enable fabrication of exchange coupled multi-layered films.

Figure 25:
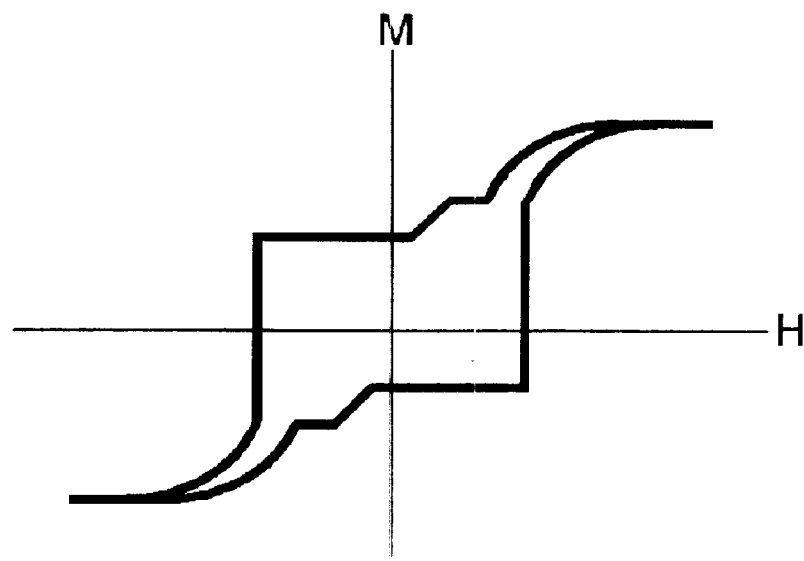
FIG. 25 is a schematic diagram of the hysteresis loop obtained by applying a magnetic field perpendicular to the film surface of a disk sample according to the first example of the invention.

This disk sample underwent measurement of M-H loop by VSM. When the hysteresis loop was measured by applying a magnetic field perpendicular to the film surface, the property as schematically shown in FIG. 25 was confirmed.

For understanding the hysteresis, a medium not having the Mn spacer layer (71) was prepared as a comparative example. In this case, the functional layer (12) and the recording layer (11) were under ferro coupling, and the functional layer (12) dominates entire magnetic property. The hysteresis loop as schematically shown in FIG. 26 was obtained.

Figure 26:
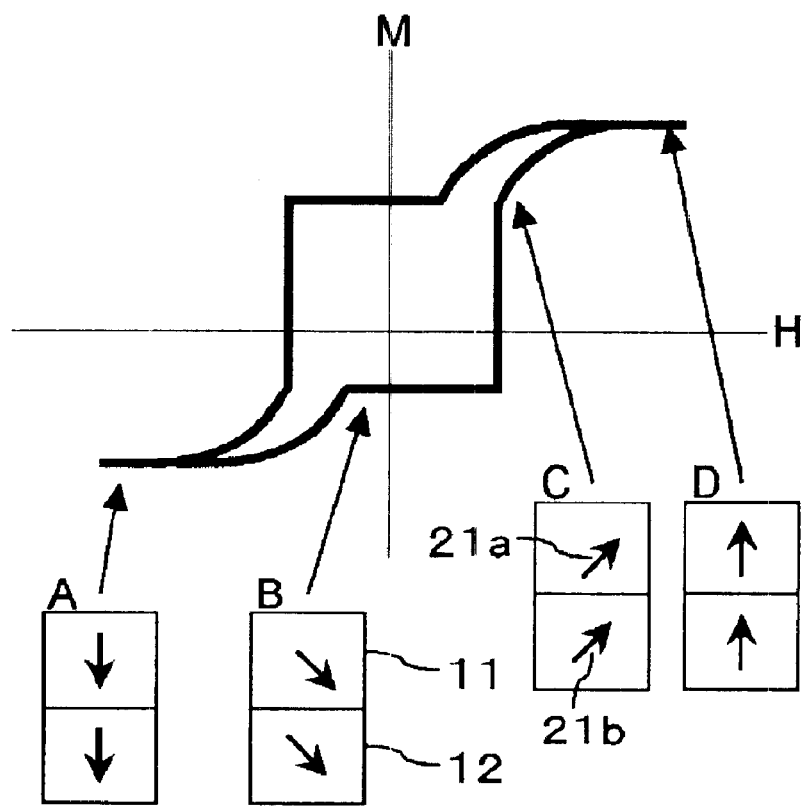
FIG. 26 is a diagram that schematically shows combinations of spin orientations in the functional layer 12 and the recording layer 11 in selective points of the hysteresis loop.

FIG. 26 schematically shows combinations of spin orientations in the functional layer 12 and the recording layer 11 in selective points of the hysteresis loop. Under the condition where a large magnetic field is applied, spins align with the direction of the magnetic field in both layers. This is the state A shown in FIG. 26. As the external magnetic field decreases, the spin reorients diagonally in the functional layer due to strong anisotropy diagonal to thereof. Simultaneously, the spin of the recording layer reorients diagonally due to exchange coupling. Then the state B is established, in which the spins completely align with the anisotropic direction. Since the process of reorientation of the spins to the diagonal direction progresses slowly, gentle change in the hysteresis loop is obtained.

Since the state B is stable, the spins do not rotate substantially in the later process where the applied field decreases and increases to the opposite direction. Therefore, the hysteresis loop substantially exhibits a horizontal straight line. Thereafter, at the point where the total external energy acting on the spin of the functional layer exceeds the anisotropic energy, the spin of the functional layer reverses. Simultaneously, the spin of the recording layer reverses. This is the state C. This process takes place quickly because it is a transition between minimum-energy points, then the hysteresis loop exhibits a vertical straight line.

After that, as the external magnetic field increases, the spin of the functional layer starts following the external magnetic field, and the spin of the recording layer also follows it. With a sufficiently large magnetic field applied, the state D is brought about.

Referring to the process explained above, the property shown in FIG. 25 as the hysteresis loop of the medium prepared as the example of the invention will be explained below.

Figure 27:
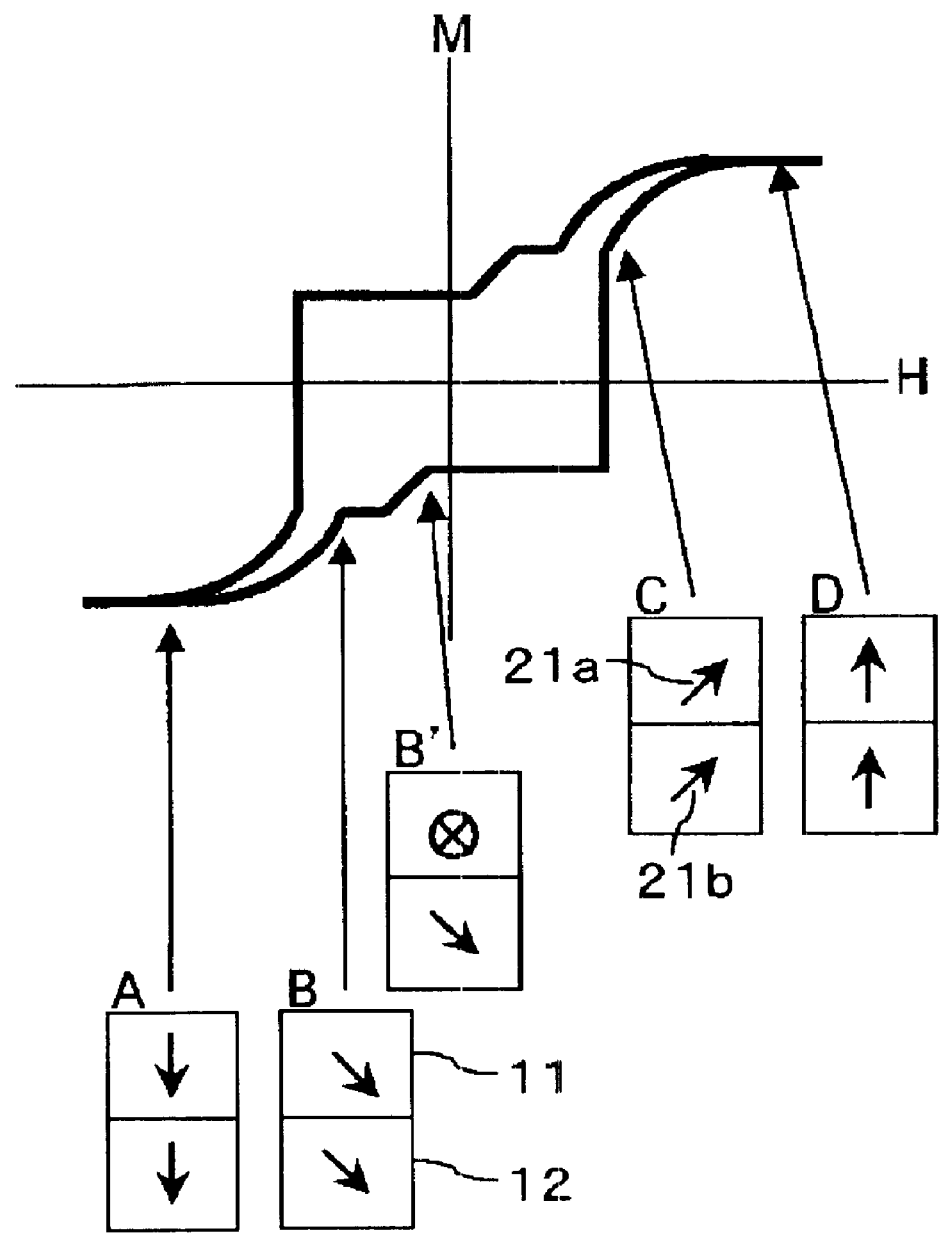
FIG. 27 is an explanatory diagram that schematically shows combinations of spin orientations in the functional layer 12 and the recording layer 11 in selective points of the hysteresis loop.

FIG. 27 is an explanatory diagram that schematically shows combinations of spin orientations in the functional layer 12 and the recording layer 11 in selective points of the hysteresis loop. Basic spin movements are identical to those explained above in conjunction with FIG. 26.

More specifically, the spins change from the state A, where the magnetization is saturated with a sufficiently large magnetic field, to the state B where the spin of the functional layer (12) starts inclining and aligns with the anisotropic direction. Up to here, the process is identical to the reference example shown in FIG. 26. Hereafter, at the point where the applied magnetic field has decreased, the spin of the recording layer (11) starts rotating perpendicular to the sheet plane, and changes to the state B' that is the minimum energy point. Thereafter, similarly to the case of FIG. 26, rapid reversal of spins occurs in the functional layer (12) and the recording layer (11) (state C) to align with the direction of the magnetic field (state D).

In this manner, the medium has been confirmed to exercise orthogonal exchange interaction by analysis of the hysteresis loop. In case of this example, ferro-exchange interaction exists simultaneously with orthogonal exchange interaction.

Subsequently, the hysteresis loop in a in-plane direction was measured in the state B' of FIG. 27. However, the magnetic field was decreased at the field where magnetization reversal occurred in the recording layer (11). As a result, the same loop as that obtained from the recording layer (11) alone was obtained. This demonstrates that magnetic reversal of the recording layer (11) alone could be brought about without inviting any change in the spin state of the functional layer (12).

Ferro coupling exists in the functional layer (12) and the recording layer (11), and application of the magnetic field in the in-plane direction contains components tending to reverse the spin in the functional layer (12). However, since the applied magnetic field is smaller than the magnetic anisotropy of the functional layer (12) (more precisely, the total energy applied to the functional layer (12) is smaller than the magnetic anisotropy), the functional layer (12) does not reverse. Therefore, regarding the in-plane direction, there is no difference between the magnetic recording medium according to the example of the invention and a conventional magnetic recording medium having a single recording layer. That is, both of them have same function as an in-plane recording mediums.

Then the thermal fluctuation was estimated for the conventional medium and orthogonal exchange coupled medium. Since the medium according to the instant example had a large thermal stability coefficient $(K_uV)/(k_BT)$, the attenuation of the magnetization was measured with the accelerated degradation setup at the temperature at 120° C.

Figure 28:
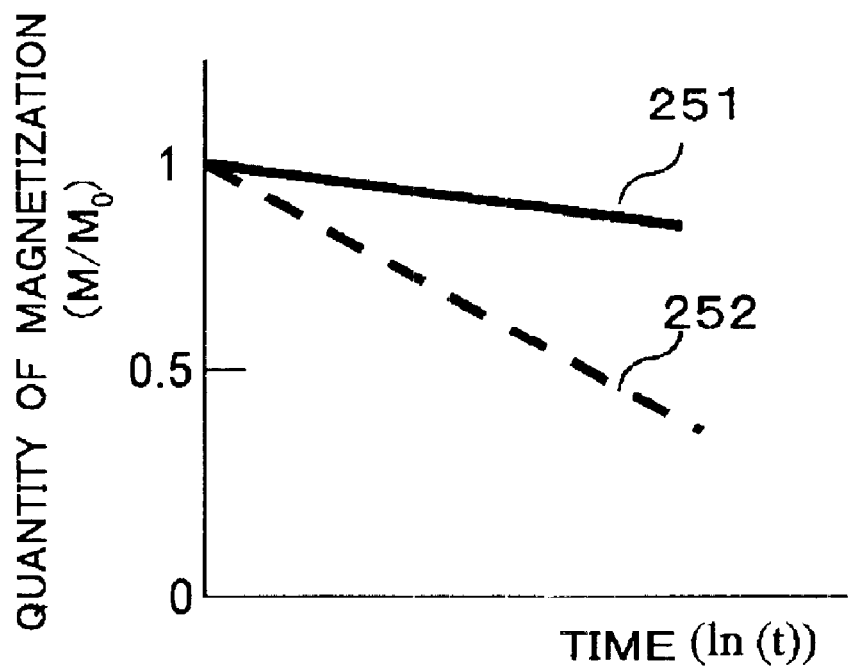
FIG. 28 is a graph that shows results of an accelerated degradation test.

FIG. 28 shows results of an accelerated degradation test. The vertical axis represents the relative magnetization normalized by the magnetization at time zero, and the horizontal axis represents the elapsed time in log-scale. Curve 251 is the experimental result of the medium under orthogonal exchange coupling according to the example of the invention, and curve 252 is the experimental results of the medium having the recording layer alone. As apparent from FIG. 28, by using the recording layer (11) and the functional layer (12) as orthogonal exchange coupling mediums, thermal stability could be improved remarkably without changing the performance as the recording medium.

A similar medium was prepared by using chromium (Cr) as the spacer layer (71) and adjusted the thickness to 0.5 nm. Substantially the same hysteresis curve as that of FIG. 25 was obtained although it was different in position of respective turning points. Further, by simultaneously sputtering Mn and Cr, a similar medium using the CrMn alloy as the spacer layer (71) was prepared. The Cr composition in the spacer layer (71) was adjusted by changing the power to the Cr target.

Figure 29:
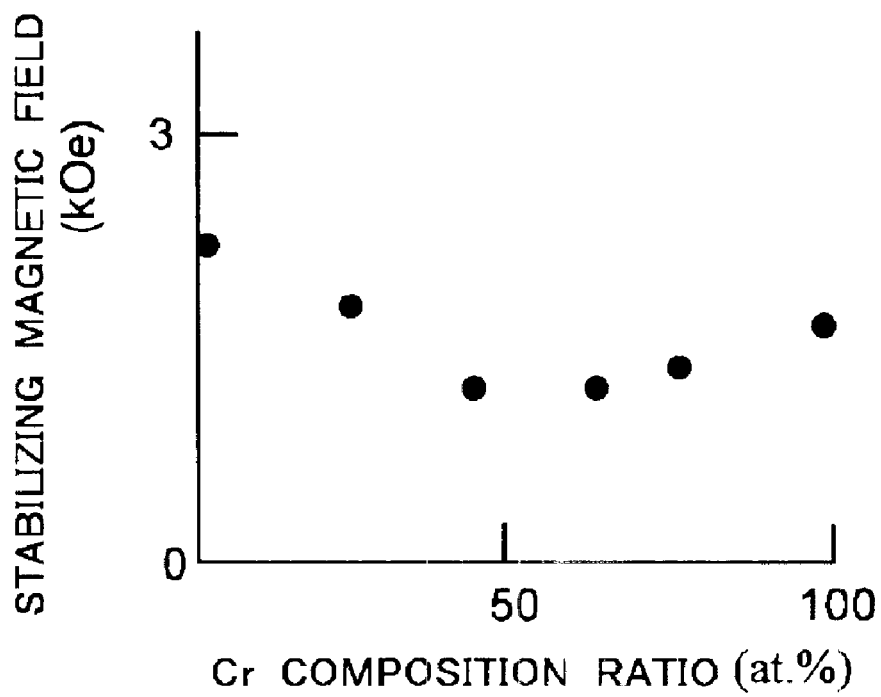
FIG. 29 is a graph that shows characteristics of a medium having a 0.4 nm thick spacer layer.

FIG. 29 shows magnetic characteristics of a medium in which the spacer layer is 0.4 nm thick. The vertical axis represents the magnetic field where the state B' in FIG. 27 is established (referred as the "stabilizing magnetic field"), whereas the horizontal axis represents the Cr composition of the spacer layer (71) in atomic %. Non-zero stabilizing magnetic field implies the existence of orthogonal exchange coupling. As apparent from FIG. 29, this example has been confirmed to have a stabilizing magnetic field not lower than 1 kOe in all Cr compositions.

SECOND EXAMPLE

As the second example of the invention, explanation will be next made about results of an experiment conducted by setting in-plane magnetic anisotropy to each of the functional layer and the recording layer by using two under layers.

In this example, a magnetic recording medium having the multi-layered structure shown in FIG. 1 was prepared. More specifically, on a NiP-plated Al disk substrate (13) of 3.5 inches, a 50 nm thick Ti first under layer, 30 nm thick NiAl second under layer, 10 nm thick CoCrPtTa functional layer (12), 10 nm thick CoCrPtTa recording layer (11) and 3 nm thick C protective layer (14) were sequentially deposited by sputtering, and a lubricant was coated thereafter. All layers were formed consecutively without breaking the vacuum.

Although a 0.2 nm thick Pt spacer layer was deposited between the functional layer (12) and the recording layer (11), existence of the Pt spacer layer could not confirmed by cross-sectional TEM probably because the Pt spacer layer was thin and the employed process of forming the film made the interface in a mixed state. The process employed here for forming the spacer layer was the method of forming the functional layer (12) by simultaneous sputtering using a CoCrTa target and a Pt target and thereafter turning off the applied power of the CoCiTa target several second earlier upon completion of the process.

In this example, because of the effect of two under layers employed, both the functional layer (12) and the recording layer (11) have in-plane magnetic anisotropy. This was also confirmed by the fact that a hysteresis loop typical for the hard axis had been observed by a VSM measurement perpendicular to the film plane.

Figure 30:
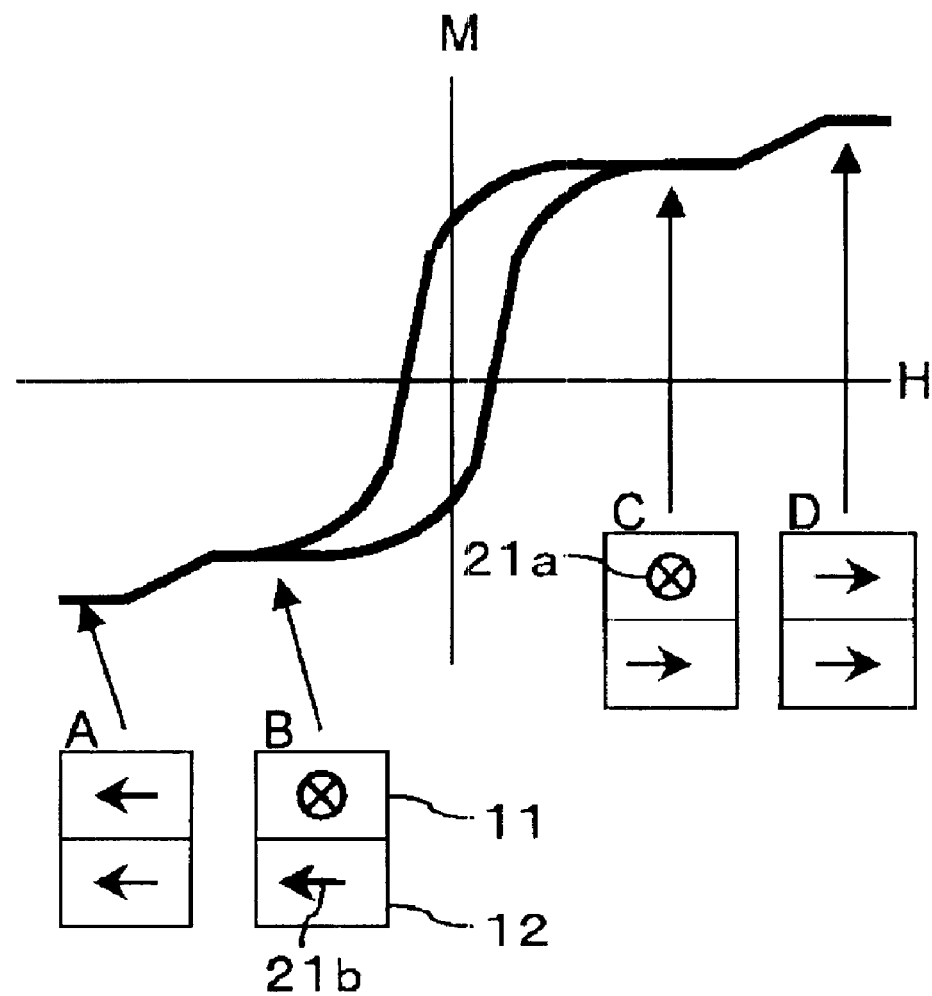
FIG. 30 is a schematic diagram of the hysteresis loop obtained by applying a magnetic field perpendicular to the film surface of the recording medium according to the second example.

FIG. 30 shows the hysteresis loop in the in-plane direction of the recording medium according to the instant example. As apparent from, the sketches of spin orientations inserted in FIG. 30, the functional layer (12) and the recording layer (11) were confirmed to be under orthogonal exchange coupling. That is, in the state A under application of a large magnetic field, spins align with the magnetic field in both layers. As the magnetic field decreases, the spin of the recording layer rotates to make an orthogonal relation with the spin of the functional layer (state B). Since this process of rotation is strongly affected by the energy balance between spins and magnetic field, the change in the hysteresis loop is gentle.

Since the orthogonal relation is stable, this configuration is maintained until a magnetic field in the opposite direction is applied and the functional layer (12) starts to reverse. Then, the configuration in which orientation is different only in the functional layer (12) (state C) is established. After that, when the opposite magnetic field increases, spins in both layers align with the external magnetic field (state D).

In the specific example shown in FIG. 30, it is the functional layer (12) that aligns with the external magnetic field, and it is the recording layer (11) that makes an orthogonal relation with it. Actually, however, in both layers, a number of spins formed therein are oriented randomly in parallel to the plane. Therefore, in a certain portion, the orientation relation as shown in FIG. 30 appears, and in another portion, another orientation relation appears, in which the functional layer (12) and the recording layer (11) are opposite in orientation of spins. Those orientation relations disperse in the medium uniformly, then the hysteresis loop is the sum of them.

Orthogonal exchange coupling in the instant example was confirmed also by the method explained below. A large magnetic field was first applied in the in-plane direction to make a state corresponding to the state B of FIG. 30 (α process). After that, the medium was rotated by 90 degrees in the in-plane direction, and a magnetic field was applied up to the magnetic field bringing about the state B to return the magnetic field to zero (β process). At that point, portions where saturated and magnetized by both the α process and the β process exist in the medium.

After that, the medium was returned to the same angle as that of the α process, and by rotating the magnetization, a state corresponding to the state C was formed. Then by again making the same alignment as that of the β process, magnetization was checked.

As a result, almost no changes were observed in the magnetization, and it was therefore confirmed that magnetization reversal did not occur. This means that the portion exercising magnetization reversal in the α process and the portion exercising magnetization reversal in the β process are independen from each other, and it is an evidence of the existence of orthogonal exchange coupling.

Apparently, multi-value magnetic recording of arbitrary two directions forming an orthogonal relation is possible by using the recording medium according to the instant example. As a comparative example, a magnetic recording medium was prepared, in which the portion of the 10 nm thick CoCrPtTa functional layer (12) and the 10 nm thick CoCrPtTa recording layer (11) was replaced by a 20 nm thick CoCrPtTa recording layer.

Thermal fluctuation of these media were evaluated by the same experiment as already explained in conjunction with FIG. 28, and the same results as those of FIG. 28 were obtained. That is, it could be confirmed that the medium according to the instant example and the medium as the comparative example were approximately equal in thermal stability, but, the medium according to the instant example having the orthogonal exchange coupling had a recording density approximately double the recording density of the medium as the comparative example.

In other words, the instant example of the invention enhances the tolerance against the thermal fluctuation. That is, since the recording density is closely related to the thickness of the film (substantially, the recording density is inversely proportional to the product (Mrt) of the residual magnetization and the thickness), the same recording density as that of the comparative example can be obtained with the instant example by approximately doubling the thickness. Then the value of thermal stability coefficient $(KuV)/(k_BT)$ is doubled, and the thermal fluctuation is remarkably reduced. Since the thermal stability coefficient $(KuV)/(k_BT)$ exponentially exerts influences to changes of magnetization by thermal fluctuation, signal degradation becomes far smaller than ½.

THIRD EXAMPLE

As the third example of the invention, explanation will be next made about results of trial preparation of a recording medium having a spacer layer between the functional layer and the recording layer and trial preparation of a magnetic recording apparatus having mounted the recording medium.

In this example, a magnetic recording medium having the cross-sectional structure shown in FIG. 8 was prepared. More specifically, on a NiP-plated Al disk substrate (13) of 3.5 inches, a 50 nm thick Ti first under layer, 30 nm thick NiAl second under layer, 10 nm thick CoCrPtTa functional layer (12), 1 nm thick Rh spacer layer (71), 10 nm thick CoCrPtTa recording layer (11) and 3 nm thick C protective layer (14) were sequentially deposited by sputtering, and a lubricant was coated thereafter.

Here again, all layers were formed consecutively without breaking the vacuum. However, before forming the under layers, the substrate was treated by texturing process to give anisotropy in the circumferential direction of the disk to the functional layer (12), and upon forming the recording layer (11), anisotropy in the radial direction of the disk was given by using a mask. After that, by the same magnetic characteristic evaluation as that of the second example, it was confirmed that orthogonal exchange interaction worked between the functional layer (12) and the recording layer (11).

In addition, by the same method as the above-explained method, media with different thickness of the Rh spacer layer (71) were prepared. Furthermore, mediums using a NiCr alloy, AuPt alloy and Cr/Pt extremely-thin multi-layered film (having the cycle of 0.2 nm) as the spacer layer (71) were also prepared.

With these media, the magnetic field necessary for changing each medium from the state A to the state B in FIG. 30 was measured. Hereinbelow, this magnetic field is called the "stabilizing magnetic field".

Figure 31:
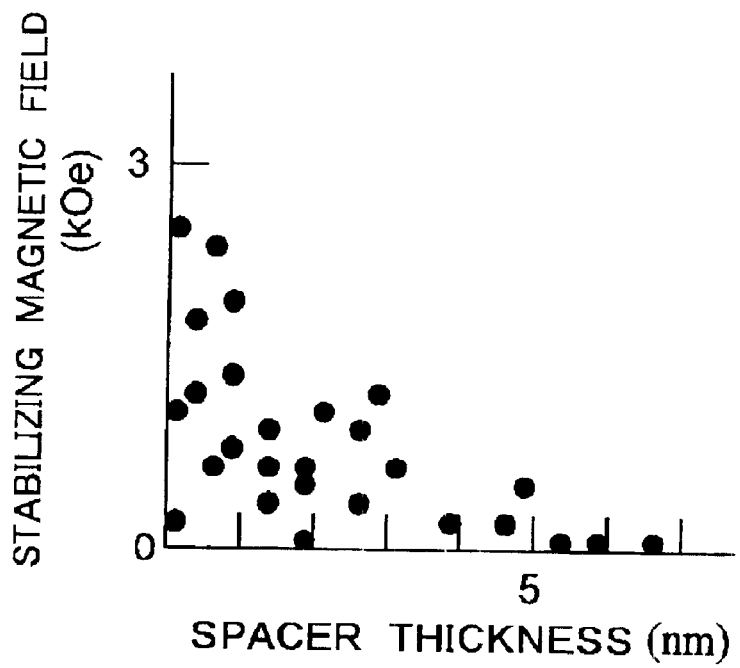
FIG. 31 is a graph that shows a relationship between the stabilizing magnetic field and the thickness of a recording medium prepared in the third example of the invention.

FIG. 31 is a graph that shows a relationship between the stabilizing magnetic field and the thickness of a recording medium prepared in the instant example. In FIG. 31, all results obtained in this example are plotted. It was confirmed from these results that orthogonal exchange coupling was produced in spacer layers (71) thinner than 5 nm.

It was also confirmed that, with the spacer layer (71) not exceeding 3 nm in thickness, more intensive orthogonal exchange coupling had been obtained. Although the dependency to the thickness was presumed to slightly change with the material, no substantial difference was observed even when the samples were roughly classified to groups such as "magnetic materials" and "noble metals", for example. Its reason is not clear, but may lie in the matter already explained in conjunction with the sixth embodiment. That is, materials, not exhibiting magnetism when existing alone, may exhibit magnetism (ferromagnetism, anti-ferromagnetism or ferrimagnetism) near interfaces when they are stacked.

By using the medium according to the instant example, multi-value magnetic recording of arbitrary two directions forming an orthogonal relation is enabled. As a comparative example, a magnetic recording medium was prepared, in which the portion of the 10 nm thick CoCrPtTa functional layer (12), 1 nm thick Rh spacer layer (71) and 10 nm thick CoCrPtTa recording layer (11) was replaced by a 20 nm thick CoCrPtTa recording layer.

Thermal fluctuation of these media were evaluated by the same experiment as already explained in conjunction with FIG. 28. In this evaluation, the media exhibited the same properties. That is, both media have similar thermal stability, but media in orthogonal exchange coupling mediums have a doubled recording density.

This means that the instant example of the invention enhances the thermal stability as already explained in conjunction with the second example. That is, since the recording density is closely related to the thickness of the film, the same recording density as that of the comparative example can be obtained with the instant example by approximately doubling the thickness. Then the value of $(KuV)/(k_BT)$ is doubled, and the thermal fluctuation is remarkably reduced.

The Inventors prepared a magnetic recording apparatus using the recording medium according to the instant example. More specifically, by setting two heads, i.e., one prepared for transversal recording and the other prepared for longitudinal recording, on a magnetic recording property evaluating apparatus (spin stand), all-one pattern was recorded in different frequencies.

After that, a head having a reproducing head using a yoke (141) and a GMR sensor (142) of a structure as shown in FIG. 17 was prepared for the reproduction test. As a result, the reproduction was performed by 6 dB lower than the case where the reproduction was performed using the transversal recording head or the longitudinal recording head.

One of reasons of the small signals may be "track deviation" caused by the use of different heads. Another reason may be insufficient resolution and a resultant decrease of the signal intensity because of a wide gap.

To cope with this problem, a head which included a reproducing head using yokes (141a, 141b) and a GMR sensor (142) having the structure of FIG. 18, was prepared for a reproduction test. As a result, improvement of signals by 2 dB was confirmed.

After that, servo signals were recorded with the transversal recording head. Then, by preparing a head modified from an ordinary longitudinal recording head by employing a yoke having the structure of FIG. 17 solely to the reproducing element portion, experimental reproduction was carried out by using that head. In this case, however, the servo information recorded by transversal recording was detected by a transversal sensor of the reproducing head with the structure of FIG. 17 to carry out tracking control thereby. The reproduced CNR was smaller by 2 dB than that used for reproduction with an ordinary transversal recording head. Also when tracking information alone or address signals alone were recorded in the transversal recording area, equivalent results were obtained.

The instant example is also applicable to HDD as an actual product. That is, current HDD undergo servo writing upon shipment from factories, and this opportunity may be used to write servo information in the functional layer by using the transversal recording head.

FOURTH EXAMPLE

As the fourth example of the invention, explanation will be next made about results of trial preparation of a recording medium using a perpendicular/in-plane combination of magnetization and using a functional layer and a recording layer of a granular system.

Also in this example, a magnetic recording medium having the cross-sectional structure shown in FIG. 8 was prepared. More specifically, on a 3.5-inch glass disk substrate (13), a 50 nm thick Ti first under layer, 10 nm thick CoCr second under layer, 10 nm thick CoCrPt functional layer (12), 0.5 nm thick Ru—FeNi spacer layer (71), 10 nm thick CoCrPtTa recording layer (11) and 3 nm thick C protective layer (14) were sequentially deposited by sputtering, and a lubricant was coated thereafter. Here again, all layers were formed consecutively without breaking the vacuum.

The second under layer contains 30 atomic % of Cr, and it is nonmagnetic. Although 8 atomic % of Fe and 9 atomic % of Ni are added to the spacer layer (71), they are dispersed as fine particles, and the spacer layer (71) exhibits nonmagnetism when existing alone.

The functional layer (12) is a perpendicular magnetization film and the recording layer (11) is a in-plane magnetization film. This aspect could be confirmed from the fact that samples without the recording layer (11) exhibited characteristics unique to perpendicular magnetization films having no hysteresis in the in-plane direction; however, after deposition of the recording film (11), hysteresis and coercive force were observed in the in-plane direction.

Figure 32:
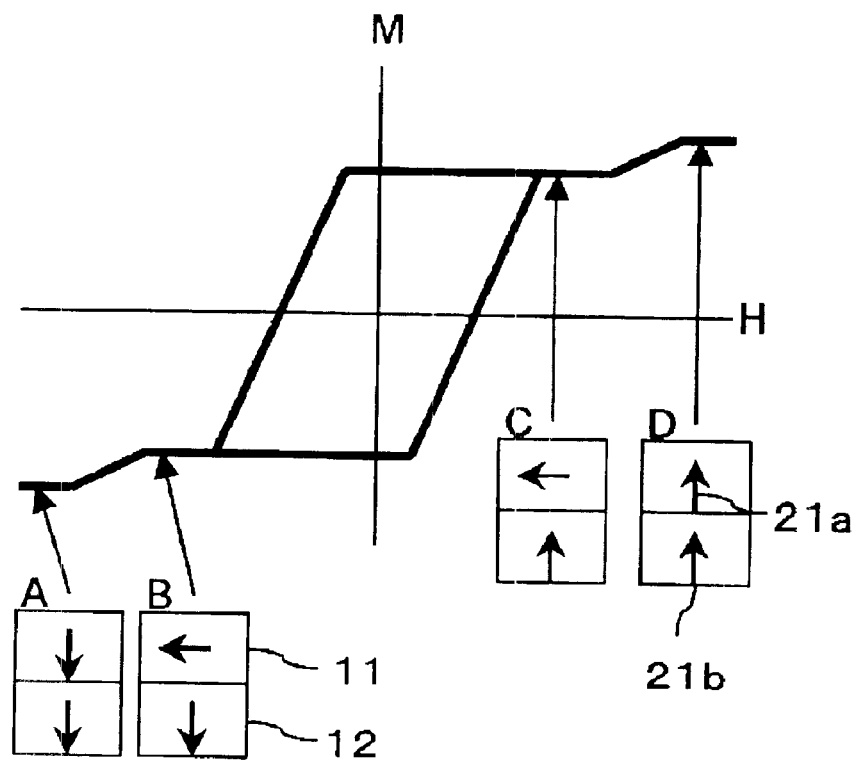
FIG. 32 is a graph that shows perpendicular hysteresis loop of the medium according to the fourth example of the invention.

FIG. 32 shows perpendicular hysteresis loop of the medium according to the instant example of the invention. As shown in the sketches of spin orientations inserted in FIG. 32, the functional layer and the recording layer were confirmed to be in orthogonal exchange coupling from the hysteresis loop.

That is, under application of a large magnetic field, spins align with the magnetic field in both layers (state A). As the magnetic decreases, the spin of the recording layer (11) rotates to make an orthogonal relation with the spin of the functional layer (11) (state B). Since this process of rotation is strongly affected by the energy balance between spins and magnetic field, the change in the hysteresis loop is gentle. Since the orthogonal relation is stable, this configuration is maintained until a magnetic field in the opposite direction is applied and the functional layer (12) starts to reverse, and after magnetization reversal, there appears a form in which orientation is different only in the functional layer (12) (state C). After that, when the opposite magnetic field increases, spins align with the external magnetic field in both layers (state D).

A hysteresis loop similar to that shown in FIG. 32 was observed also in the in-plane direction. Assuming that the spin orientation of each layer rotates similarly to that shown in FIG. 32, this result can be explained.

Orthogonal exchange coupling was confirmed also by the following method, following to or based on the technique explained in conjunction with the second example. A large magnetic field was first applied in the in-plane direction to make a state corresponding to the state B. After that, a magnetic field is applied in the perpendicular direction up to the magnetic field bringing about the state B to return the magnetic field to zero. At that point, a state saturated and magnetized in both the perpendicular direction and the in-plane direction of the medium is established. After that, a magnetic field was applied in the in-plane direction to bring about magnetization reversal and make a state corresponding to the state C. Then, magnetization in the perpendicular direction was checked again. As a result, almost no changes were observed in magnetization, and it was therefore confirmed that magnetization reversal did not occur. This directly means that in-plane magnetization reversal and perpendicular magnetization reversal are independent from each other, and it evidenced existence of orthogonal exchange coupling.

Apparently, multi-value magnetic recording of arbitrary two directions forming an orthogonal relation is possible by using the recording medium according to the instant example. As a comparative example, a magnetic recording medium was prepared, in which the portion of the 10 nm thick CoCrPt functional layer, 0.5 nm thick Ru—FeNi spacer layer and 10 nm thick CoCrPtTa recording layer was replaced by a 20 nm thick CoCrPtTa recording layer.

Thermal fluctuation of these media was evaluated by the same experiment as already explained in conjunction with FIG. 28, and the same results were obtained. That is, both media have similar thermal stability, but media in orthogonal exchange coupling mediums have a doubled recording density.

This means that the instant example of the invention enhances the thermal stability as already explained in conjunction with the second and third examples. That is, since the recording density is closely related to the thickness of the film, the same recording density as that of the comparative example can be obtained with the instant example by approximately doubling the thickness. Then the value of thermal stability coefficient (KuV)/(kBT) is doubled, and the thermal fluctuation is remarkably reduced.

The Inventors next examined effects of elements added to the spacer layer (71) to bring about orthogonal exchange coupling. Using the same evaluation method as that already explained in conjunction with FIG. 32 to confirm whether orthogonal exchange interaction existed or not, it was found out that large orthogonal exchange interaction could obtained when any of Co, Fe, Ni, Mn, Cr, Pt and Pd was added. Examination was continued to find appropriate matrix materials of the spacer layer in combination of these additive elements, and it was confirmed that especially large orthogonal exchange coupling could be obtained at least when using Ru, Re, Rh, Ir, Tc, Au, Ag, Cu or Si.

Quantities of additive elements were also examined, and it was confirmed that Co, Fe and Ni, when added by beyond 45 atomic %, undesirably formed a magnetic three-layered film with exchange coupling, and did not generate orthogonal exchange interaction. When the quantity was limited not to exceed 15 atomic %, they were confirmed to generate orthogonal exchange interaction.

The Inventors prepared a medium modified from the medium structure according to the instant example by replacing the CoCr second under layer with a lamination of a 30 nm thick FeTaC soft-magnetic under layer and a 10 nm thick CoCr second under layer, and prepared a magnetic disk apparatus using that medium. A head including two elements, namely, a single-pole type head for perpendicular recording and a ring head for longitudinal recording, was used to record all-one pattern in different frequencies. For reproduction, an ordinary element for reproduction of in-plane magnetization was used. As a result, it was confirmed that recording and reproduction could be carried out with a single head independently for perpendicular magnetization and in-plane magnetization.

FIFTH EXAMPLE

As the fifth example of the invention, a magnetic recording medium employing multi-layer will be next explained.

In this example, a magnetic recording medium having the cross-sectional structure schematically shown in FIG. 8 was prepared. On a 3.5-inch glass disk substrate (13), a 20 nm thick Ti under layer, functional layer (12) stacking 5 nm thick Co, 0.8 nm thick Ru and 5 nm thick Co, 0.5 nm thick Ir spacer layer (71), recording layer (11) as a Co/Pd multi-layered film, and 3 nm thick C protective layer (14) were sequentially deposited by sputtering, and a lubricant was coated thereafter. Here again, all layers were formed consecutively without breaking the vacuum.

The recording layer (11) had a magnetic multi-layer structure made by alternate stacking of 0.3 nm of Co layers and 0.7 nm of Pd layers for 10 cycles. The functional layer (12) is a so-called synthetic anti-ferromagnetic layer that exhibits anti-ferromagnetism when existing alone.

The functional layer (12) has in-plane anisotropy, and the recording layer (11) has perpendicular anisotropy. After the Ir spacer layer (71) was stacked, etching by 15W RF sputtering was carried out to form surface roughness of Ra=1 nm.

The perpendicular hysteresis loop of the medium according to the instant example turned out substantially the same as the hysteresis loop shown in FIG. 32. However, among the sketches of spin orientations inserted therein, orientation of the functional layer (12) corresponds to the spin orientation in the Co layer forming Co/Ru/Co. Apparently from FIG. 32, the hysteresis loop demonstrated that the functional layer (12) and the recording layer (11) were under orthogonal exchange coupling because if the Co/Ru/Co layer is under perpendicular ferro coupling, the increase in the coercive force of the Co/Pd layer is only observed.

The medium according to the instant example was enhanced in thermal stability as compared with a magnetic recording medium having only a recording layer having a similar multi-layer structure. Using the above-explained structure, a medium as a comparative example was prepared by omitting the Co/Ru/Co functional layer (12), and the magnetization decay thereof was evaluated at 140° C., and the same results as those of FIG. 28 were obtained. Enhancement of the thermal stability of the medium according to the instant example is assumed to have resulted from the fact that magnetic particles had thermal stability coefficient $(KuV)/(k_BT)$ as much as combining the functional layer.

Under the assumption that roughness of the spacer layer affects the generation of orthogonal exchange coupling, the Inventors prepared samples of the Ir spacer layer different in surface roughness. Process parameters such as the sputtering pressure, sputtering gas (Ne, Ar, Kr and Xe as well as $N_2$, $O_2$, $H_2$ and $CH_2$ to be added to the former), power to the target and distance from the target to the substrate were changed. Also an etching by RF/DC sputtering was examined.

It was found thereby that large orthogonal exchange interaction could be obtained when one or both of the interface between the spacer layer (71) and the functional layer (12) and the interface between the spacer layer (71) and the recording layer (11) have the average roughness of 0.5 nm or more. It was also confirmed that orthogonal exchange interaction was uniform over the entire surface of a 3.5-inch disk in diameter, and this feature would be sufficiently acceptable for magnetic recording mediums. The roughness referred to here is the value which is obtained by the numerical processing of the AFM trace of the functional layer made under the same condition or the surface of the spacer layer deposited thereon.

The functional layer (12), spacer layer (71) and recording layer (11) were formed consecutively under conditions which gives known surface roughness. Then cross-sectional TEM observation was performed. It was confirmed that the same surface roughness was obtained. This means that the roughness of the interface can be estimated by cross-sectional TEM as well.

Spacer materials were also examined, and at least Ru, Re, Rh, Ir, Tc, Au, Ag, Cu and Si were confirmed to be effective for inducing orthogonal exchange coupling under similar surface roughness.

SIXTH EXAMPLE

As the sixth example of the invention, a magnetic recording medium having an island-like spacer layer will be next explained.

Also in this example, a magnetic recording medium based on the cross-sectional structure schematically shown in FIG. 8 was prepared. More specifically, on a 3.5-inch glass disk substrate (13), a 40 nm thick SiN under layer, 10 nm thick TbFeCo functional layer (12), Au spacer layer (71), 10 nm thick CoCrPtTa recording layer (11), and 3 nm thick C protective layer (14) were sequentially deposited by sputtering, and a lubricant was coated thereafter. Here again, all layers were formed consecutively without breaking the vacuum.

The functional layer (12) used in this example is an amorphous rare earth=transition metal alloys used in magneto-optical recording mediums, and it is a continuous magnetic thin film having perpendicular magnetic anisotropy. The recording layer (11) is deposited by an oblique sputtering with in-plane magnetic anisotropy in the circumferential direction of the disk. The nominal thickness of the Au spacer layer (71) was 0.2 nm, however, from a result of AFM examination of the surface of the spacer layer prepared under the same condition, the Au spacer layer (71) showed the form of islands as large as approximately 1 through 5 nm in diameter. This structure was confirmed also by cross-sectional TEM as a discontinuous film.

It was confirmed that the medium according to the instant example exhibited orthogonal exchange coupling by evaluation similar to that already explained in conjunction with the fourth example.

The medium according to this example was more enhanced in thermal stability than a medium having the recording layer alone. That is, a medium without the TbFeCo functional layer (12) was prepared, and its magnetization decay was examined at 140° C. The same results as those shown in FIG. 28 were obtained. Enhancement of the thermal stability is due to the magnetic continuity between the recording layer (11) and the functional layer (12).

Similar effects of induction of orthogonal exchange coupling by the island-like spacer layer (71) were confirmed at least with Ru, Re, Rh, Ir, Tc, Au, Ag, Cu, Si, Mn or Cr. As a result of thickness dependence of the spacer layer (71), similar effects were confirmed not only when the spacer layer (71) is island-shaped but also when the spacer layer (71) has a mesh-like structure, which is made by forming bores in a continuous film. That is, the spacer layer (71) according to the instant example has a structure as shown in FIG. 10 or FIG. 11. Large orthogonal exchange coupling was confirmed when the size of the island or mesh was 0.5 nm through 50 nm.

SEVENTH EXAMPLE

As the seventh example of the invention, a magnetic recording medium having a discontinuous interface layer was prepared. Results of heat-assisted recording with this medium will be next explained below.

Also in this example, the magnetic recording medium prepared had a structure similar to the cross-sectional structure schematically shown in FIG. 11. More specifically, on a 3.5 inch glass disk substrate (13), a 40 nm thick SiN under layer, 10 nm thick GdDyTbCo functional layer (12), 0.7 nm thick Si spacer layer (71), recording layer (11) having a multi-layer structure laminating ten cycles of 0.3 nm thick Co and 0.7 nm thick Pd, and 3 nm thick C protective layer (14) were sequentially deposited by sputtering, and a lubricant was coated thereafter. Here again, all layers were formed consecutively without breaking the vacuum.

The functional layer (12) is an amorphous rare earth-transition metal alloys used in magneto-optical recording media, and it is a continuous magnetic thin film having in-plane magnetic anisotropy. The recording layer (11) is the same magnetic multi-layer as that explained in conjunction with the fifth example, and it has perpendicular magnetic anisotropy. After the Si spacer layer (71) was deposited, 0.2 nm thick Cr was deposited as the interface layer (111). The surface roughness of the interface layer (111) was estimated by AFM. Cr interface layer (111) was confirmed to form islands of a size from 0.6 to 10 nm in diameter. This aspect can be estimated also by cross-sectional TEM in which the portion of Cr is observed as a discontinuous film.

The recording medium according to the instant example was confirmed to have orthogonal exchange coupling of a in-plane/perpendicular combination of magnetization by evaluation similar to that explained before in conjunction with the fourth example.

The medium according to this example was more enhanced in the thermal stability than a medium having the recording layer alone. That is, a medium without the GdDyTbCo functional layer (12) was prepared, and its magnetization decay was examined at 140° C. The same results as those shown in FIG. 28 were obtained. Here again, enhancement of the thermal stability is due to the magnetic continuity between the recording layer (11) and the functional layer (12).

Through experiments with various materials and under various process parameters regarding the instant embodiment, it has been confirmed that similar effects of inducing orthogonal exchange coupling are obtained when the interface layer (111) is made of material different from that of the spacer layer (71) and has a island-like or mesh-like configuration similar to that explained with reference to sixth embodiment. The same effects were confirmed also when the interface layer (111) underlies the spacer layer (71).

From the viewpoint of the material of the interface layer (11), the use of the interface layer (111) is especially effective when it is made of a material used in the functional layer (12), recording layer (11) or spacer layer (71) but different in composition, or any element selected from Ru, Re, Rh, Ir, Tc, Au, Ag, Cu, Si, Fe, Ni, Pt, Pd, Cr, Mn and Al.

Subsequently, the recording property of the magnetic recording medium according to the instant example was evaluated with a read/write HDD tester with local heating method. This apparatus is based on an ordinary HDD evaluating apparatus (spin stand) and additionally includes an optical pickup for use in an optical disk. Wavelength of the laser was 633 nm. Laser beams are irradiated from the bottom of the substrate through an external lens mounted in a flying head. The external lens system makes up SIL (solid immersion lens) designed to focus approximately at the recording layer.

Diameter of the laser spot is approximately 500 nm in FWHM (full width at half maximum). By a precise piezo actuator, the position to be irradiated by light and the gap position of the recording head were aligned. The temperature $T_{cE}$ where orthogonal exchange coupling was disappeared was estimated to be 260° C. by VSM.

Recording and reproduction were first tried without laser irradiation, and the recording property was examined as a reference. Then, recording test was carried out with irradiating the laser. The relation between the irradiation power and the rise of temperature of the medium was estimated by another experiment and simulation. Then, by changing the laser power, relation between the recording temperature Tw and the CN ratio (CNR) of the reproduced signal was obtained. As a result of single-frequency recording of 400 kfci, it was confirmed that a reproduction output larger than the reference could be obtained when $Tw > T_{cE}$.

Figure 22:
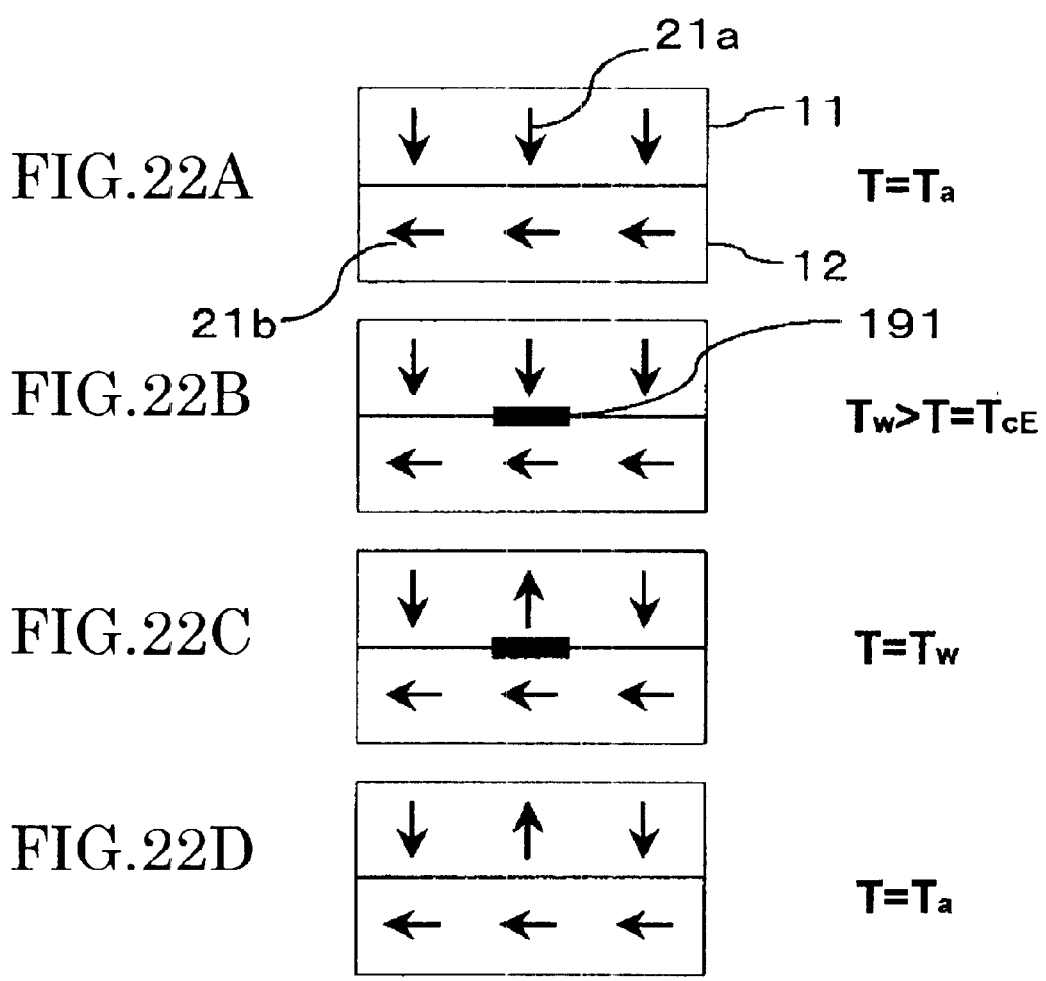
FIGS. 22A through 22D are diagrams that schematically show the process of magnetization reversal in the recording layer 11 and the functional layer 12 in a cross-sectional structure of a magnetic recording medium.
Figure 24:
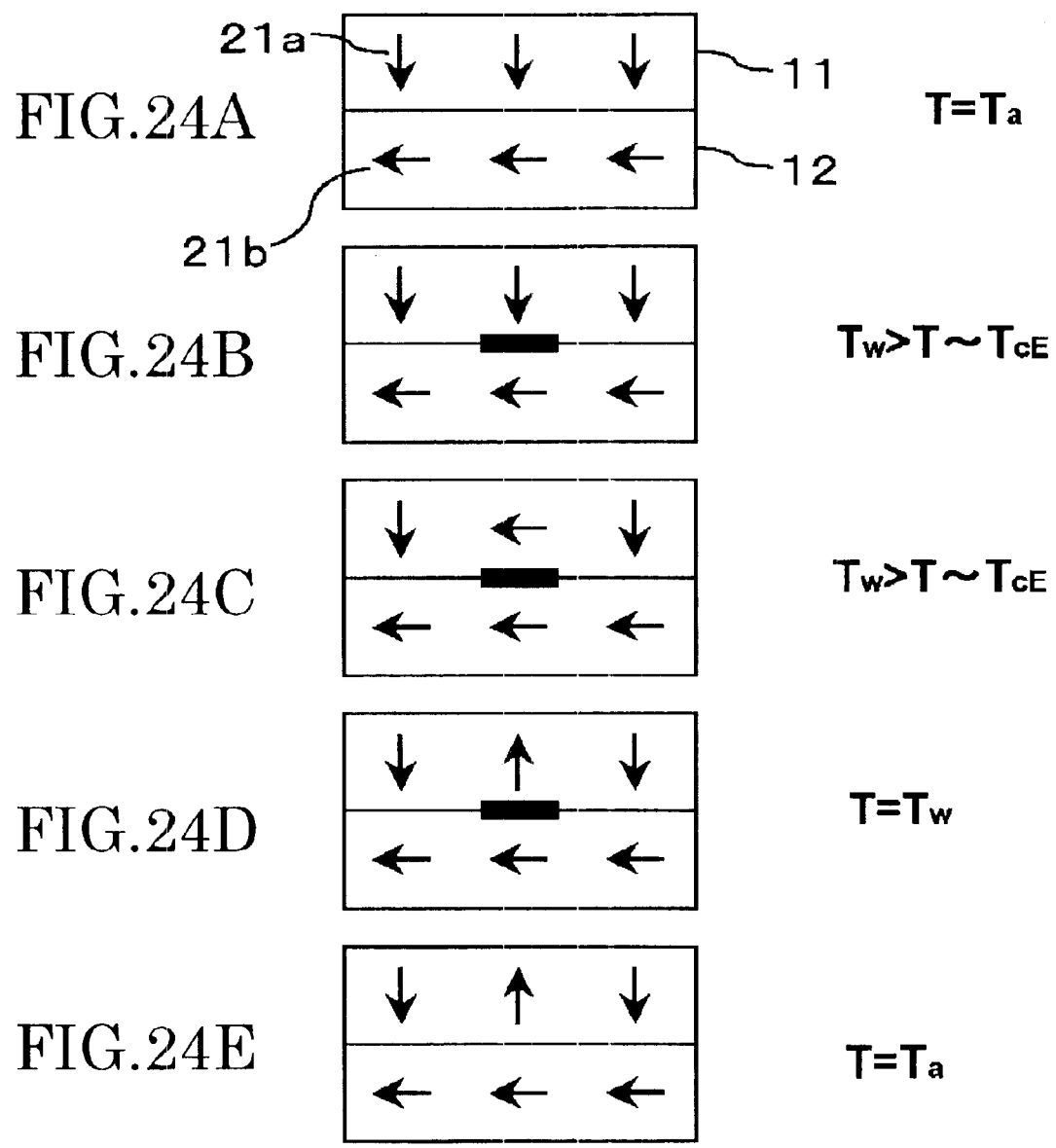
FIGS. 24A through 24E are diagrams that show sections of a magnetic recording medium for schematically showing the process of magnetization reversal in the recording layer 11 and the functional layer 12.

It is assumed that the large reproduction output was obtained through the process as shown in FIGS. 22 and 24. Possible causes of this effect are improvement of efficiency of magnetization reversal by reduction of the reversal energy, as explained before, and improvement of efficiency of magnetization reversal by ferro or anti-ferro coupling.

EIGHTH EXAMPLE

As the eighth example of the invention, explanation will be made about a sample of magnetic recording medium in which spins of both the recording layer and the functional layer are faced at the interface.

In this example, a magnetic recording medium based on the cross-sectional structure schematically shown in FIG. 1 was prepared. More specifically, on a 3.5 inch glass disk substrate (13), a 20 nm thick Cr under layer, 10 nm thick NiO functional layer (12), 10 nm thick CoCrPtTa recording layer (11) and 3 nm thick C protective layer (14) were sequentially deposited by sputtering, and a lubricant was coated thereafter. Here again, all layers were formed consecutively without breaking, the vacuum.

The functional layer (12) used in this example is an anti-ferromagnetic thin film, and it is endowed with in-plane magnetic anisotropy in the circumferential direction of the disk by applying a magnetic field in the circumferential direction upon deposition thereof. The recording layer (11) is identical to that already explained in conjunction with the fifth example, and it has perpendicular magnetic anisotropy.

The recording medium according to the instant example was confirmed to have orthogonal exchange coupling of a perpendicular/in-plane combination of magnetization by evaluation similar to that explained before in conjunction with the fifth example. The residual magnetization in the recording layer (11) is largest in the radial direction of the disk. This means that here is established orthogonal exchange coupling in which the radial direction of the disk is dominant spin orientation in the recording layer (11) and the circumferential direction of the disk is dominant spin orientation in the functional layer.

The medium according to this example was more enhanced in thermal stability than a medium having only the recording layer. That is, a medium having only the recording layer (11) was prepared, and its magnetization decay was examined at 160° C. The same results as those shown in FIG. 28 were obtained. Enhancement of the thermal stability is due to the magnetic continuity between the recording layer (11) and the functional layer (12).

Similar effects of inducing orthogonal exchange coupling were obtained also when using CrPt as the functional layer (12), applying a magnetic field in the perpendicular direction during deposition, and using a multi-layer type perpendicular recording layer stacking ten cycles of 0.3 nm Co and 0.7 nm Pd similarly to the fifth example. CrPt is known to be a ferrimagnetic material probably due to the same mechanism as that of the above-explained anti-ferromagnetic material.

Similar effects of inducing orthogonal exchange coupling were confirmed also when using the spacer layer (71) already explained in conjunction with the third to seventh examples.

NINTH EXAMPLE

As the ninth example of the invention, explanation will be made about the result of preparing a sample of magnetic recording medium having a structure in which magnetic particles are isolated by a nonmagnetic material in each of the functional layer and the recording layer.

In this example, a recording medium having a structure similar to that explained in conjunction with the fourth example was prepared. In this case, however, in the process of depositing the functional layer (12) through the recording layer (11), Ar containing oxygen of partial pressure 5% was used as the sputtering gas, and the sputtering pressure was adjusted to 5 Pa. Then the microstructure of the recording layer (11) and the functional layer (12) was observed by using plan and cross-sectional TEM. As a result, columnar magnetic crystal grains (approximately 7 nm in diameter) mainly made of Co, Pt and Cr were isolated by nonmagnetic portions made of amorphous Co—O and a small amount of Cr. Existence (localization) of Ta as the additive element of the recording layer (11) was not clear.

The isolated structure extended throughout the functional layer (12), spacer layer (71) and recording layer (11). In samples of the functional layer (12) alone or the recording layer (11) alone, reversal volume V was evaluated by VSM. As a result, V was substantially equal to the product of the grain size of the magnetic crystal and the thickness of the film. This means that the recording resolution is about the magnetic grain size in both the functional layer (12) and the recording layer (11).

The medium according to this example was also more enhanced in thermal stability than a medium having only the recording layer. That is, a medium having only the recording layer (11) was prepared, and its magnetization decay was examined at 100° C. As a result, the same results as those shown in FIG. 28 were obtained. Here again, enhancement of the thermal stability is due to the magnetic continuity between the recording layer (11) and the functional layer (12).

TENTH EXAMPLE

As the tenth example of the invention, explanation will be made about the result of preparing a sample of magnetic recording medium in which the size of the magnetic particle is larger in the functional layer than in the recording layer.

Also in this example, a magnetic recording medium based on the cross-sectional structure schematically shown in FIG. 8 was prepared. More specifically, on a 3.5-inch glass disk substrate (13), a 40 nm thick V under layer, 10 nm thick CoPt functional layer (12), 0.5 nm thick Ru—CrPd spacer layer (71), multi-layer recording layer (11) stacking ten cycles of 0.3 nm thick CoO and 0.7 nm thick Pd, and 3 nm thick C protective layer (14) were sequentially deposited by sputtering, and a lubricant was coated thereafter.

Here again, all layers were formed consecutively without breaking the vacuum. However, the condition of (sputtering gas/pressure) was adjusted to (Ar/1 Pa) for deposition of the functional layer (12) and (Ar+$O_2$/5 Pa) for deposition of the spacer layer (71)/recording layer (11). The functional layer (12) exhibited in-plane magnetic anisotropy whereas the recording layer (11) exhibited perpendicular magnetic anisotropy.

The microstructure of the recording layer (11) and the functional layer (12) was observed by using plan and cross-sectional TEM. As a result, as shown in FIG. 7, the functional layer (12) exhibited a structure in which columnar magnetic crystal grains (approximately 15 nm in diameter) mainly made of Co and Pt were isolated by nonmagnetic portions made of amorphous Co—O. The recording layer (11) exhibited a structure in which columnar magnetic crystal grains (approximately 7 nm in diameter) mainly made of Co, Pt and Cr were isolated by nonmagnetic portions made of amorphous Co—O and a small amount of Cr.

By detailed observation of the cross-sectional microstructure, it was confirmed that that the functional layer (12) and the recording layer (11) were different in crystal grain size and that about two crystal grains of the recording layer (11) grew on each crystal grain of the functional layer. It is assumed that the deposition condition for the recording layer (11) permitted a large amount of an intergranular substance to enter, but because the recording layer (11) keeps epitaxial continuity with the functional layer (12), completely independent crystal growth is prevented in the recording layer (11).

With a thin film sample of the recording layer (11) alone, reversal volume V was evaluated by VSM. As a result, the volume V was substantially equal to the product of the grain size of the magnetic crystal of each layer and the thickness of the film. This means that the recording resolution is about the magnetic grain size in both the functional layer (12) and the recording layer (11).

By evaluation similar to that explained before in conjunction with the ninth example, similar improvement of the thermal stability was confirmed, but the extent of the improvement of this example was larger than that of the ninth embodiment. Although this example is the same as the ninth embodiment in that the crystal grains are continuous from the recording layer (11), large crystal grains of the functional layer (12) results in the increase of the thermal stability coefficient $(KuV)/(k_BT)$ by about four times.

Heretofore, some embodiments of the invention have been explained with reference to specific examples. However, the invention is not limited to these specific examples.

For example, as to laminating configuration of the substrate and other layers forming the magnetic recording medium, material and thickness of each layer, the invention encompasses any changes by persons skilled in the art provided they attain the effects of respective embodiments of the invention.

The magnetic recording medium according to any embodiment of the invention need not be disk-shaped, but any other form of the medium, such as a card, tape, label, or the like, will also ensure the same effects.

The magnetic recording apparatus according to any embodiment of the invention may be either of a rigid type recording medium or of a removable type recording medium.

Furthermore, the invention encompasses any magnetic recording medium, magnetic recording apparatus and magnetic recording method that can be adequately modified and brought into actual use by persons skilled in the art on the basis of the magnetic recording medium, magnetic storage device and magnetic recording method according to any embodiment of the invention.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A magnetic recording medium comprising:
    a functional layer comprising a first magnetic material;
    a recording layer stacked on said functional layer and comprising a second magnetic material,
    said first magnetic material and said second magnetic material exerting an exchange coupling interaction in directions making a substantially orthogonal relation with each other at a room temperature; and
    a spacer layer provided between said functional layer and said recording layer and different in composition from said functional layer and said recording layer,
    wherein said spacer layer is formed in island-shaped or mesh-shaped.

2. A magnetic recording medium comprising:
    a functional layer comprising a first magnetic material;
    a recording layer stacked on said functional layer and comprising a second magnetic material,
    said first magnetic material and said second magnetic material exerting an exchange coupling interaction in directions making a substantially orthogonal relation with each other at a room temperature;
    a spacer layer provided between said functional layer and said recording layer and different in composition from said functional layer and said recording layer; and
    an interface layer of island-shaped or mesh-shaped provided to at least one of an interface between said spacer layer and said functional layer and an interface between said spacer layer and said recording layer.

3. A magnetic recording medium comprising:
    a functional layer comprising a first magnetic material; and
    a recording layer stacked on said functional layer and comprising a second magnetic material,
    said first magnetic material and said second magnetic material exerting an exchange coupling interaction in directions making a substantially orthogonal relation with each other at a room temperature,
    wherein said first magnetic material is made of an antiferromagnetic material or a ferromagnetic material, and both of opposite spins exist along an interface between said functional layer and said recording layer.

4. A magnetic recording medium comprising:
    a functional layer comprising a first magnetic material;
    a recording layer stacked on said functional layer and comprising a second magnetic material,
    said first magnetic material and said second magnetic material exerting an exchange coupling interaction in directions making a substantially orthogonal relation with each other at a room temperature; and
    a spacer layer provided between said functional layer and said recording layer and different in composition from said functional layer and said recording layer,
    wherein said spacer layer is made of a nonmagnetic material added with at least one element selected from cobalt (Co), iron (Fe), nickel (Ni), manganese (Mn), chromium (Cr), platinum (Pt) and palladium (Pd), and
    wherein the nonmagnetic material is made of at least one of elements selected from a group consisting of ruthenium (Ru), renium (Re), rhodium (Rh), iridium (Ir), technetium (Tc), gold (Au), silver (Ag), copper (Cu) and silicon (Si).

* * * * *